US007224852B2

(12) United States Patent
Lipton et al.

(10) Patent No.: US 7,224,852 B2
(45) Date of Patent: May 29, 2007

(54) VIDEO SEGMENTATION USING STATISTICAL PIXEL MODELING

(75) Inventors: Alan J. Lipton, Herndon, VA (US); Mark C. Allmen, Morrison, CO (US); Niels Haering, Reston, VA (US); William E. Severson, Littleton, CO (US); Thomas M. Strat, Oakton, VA (US)

(73) Assignee: ObjectVideo, Inc., Reston, VA (US)

( * ) Notice: Subject to any disclaimer, the term of this patent is extended or adjusted under 35 U.S.C. 154(b) by 531 days.

(21) Appl. No.: 10/667,148

(22) Filed: Sep. 22, 2003

(65) Prior Publication Data

US 2004/0151374 A1    Aug. 5, 2004

Related U.S. Application Data

(63) Continuation-in-part of application No. 09/815,385, filed on Mar. 23, 2001, now Pat. No. 6,625,310.

(51) Int. Cl.
*G06K 9/32*     (2006.01)
*H04N 7/18*     (2006.01)
*G06K 9/00*     (2006.01)

(52) U.S. Cl. ..................................... 382/294
(58) Field of Classification Search ............... 382/103, 382/173, 181, 224, 232, 233, 260–264, 276, 382/294; 375/240.01, 240.12, 240.29, 343 375/350; 348/143, 239, 224.1, 270, 290, 348/700–702; 340/541, 572.1, 539.25
See application file for complete search history.

(56) References Cited

U.S. PATENT DOCUMENTS

| | | | |
|---|---|---|---|
| 4,764,971 A | 8/1988 | Sullivan | |
| 4,949,389 A | 8/1990 | Allebach et al. | |
| 5,048,095 A | 9/1991 | Bhanu et al. | |
| 5,448,651 A | 9/1995 | Sakou et al. | |
| 5,519,789 A | 5/1996 | Etoh | |
| 5,586,200 A | 12/1996 | Devaney et al. | |
| 5,671,294 A | 9/1997 | Rogers et al. | |
| 5,696,551 A | 12/1997 | Katto | |
| 5,724,456 A | 3/1998 | Boyack et al. | |
| 5,764,306 A | 6/1998 | Steffano | |
| 5,768,413 A | 6/1998 | Levin et al. | |
| 5,802,203 A | 9/1998 | Black et al. | |
| 5,875,305 A * | 2/1999 | Winter et al. ............... | 709/231 |
| 5,990,955 A | 11/1999 | Koz | |
| 6,008,865 A | 12/1999 | Fogel | |
| 6,049,363 A * | 4/2000 | Courtney et al. ........... | 348/700 |
| 6,058,210 A | 5/2000 | de Queiroz et al. | |
| 6,078,619 A | 6/2000 | Monro et al. | |
| 6,195,458 B1 | 2/2001 | Warnick et al. | |
| 6,249,613 B1 | 6/2001 | Crinon et al. | |
| 6,278,466 B1 | 8/2001 | Chen | |
| 6,337,917 B1 | 1/2002 | Onural et al. | |

(Continued)

*Primary Examiner*—Amir Alavi
(74) *Attorney, Agent, or Firm*—Venable LLP; Michael A. Sartori; Kavita B. Lepping

(57) ABSTRACT

A method for segmenting video data into foreground and background portions utilizes statistical modeling of the pixels. A statistical model of the background is built for each pixel, and each pixel in an incoming video frame is compared with the background statistical model for that pixel. Pixels are determined to be foreground or background based on the comparisons. The method for segmenting video data may be further incorporated into a method for implementing an intelligent video surveillance system.

5 Claims, 14 Drawing Sheets

U.S. PATENT DOCUMENTS

| | | |
|---|---|---|
| 6,349,113 B1 | 2/2002 | Mech et al. |
| 6,393,054 B1 | 5/2002 | Altunbasak et al. |
| 6,396,876 B1 | 5/2002 | Babonneau et al. |
| 6,404,925 B1 | 6/2002 | Foote et al. |
| 6,625,310 B2 * | 9/2003 | Lipton et al. ............... 382/173 |
| 6,987,451 B2 * | 1/2006 | McKeown et al. ......... 340/541 |
| 2002/0063154 A1 * | 5/2002 | Hoyos et al. ............ 235/382.5 |
| 2004/0151374 A1 * | 8/2004 | Lipton et al. ............... 382/181 |
| 2004/0240546 A1 * | 12/2004 | Wells .................... 375/240.12 |
| 2005/0169367 A1 * | 8/2005 | Venetianer et al. .... 375/240.01 |
| 2006/0066722 A1 * | 3/2006 | Yin et al. .................. 348/143 |

* cited by examiner

VIDEO SEGMENTATION USING STATISTICAL PIXEL MODELING

CROSS-REFERENCE TO RELATED APPLICATION

This application is a continuation-in-part of U.S. application Ser. No. 09/815,385 now Pat. No. 6,625,310, filed on Mar. 23, 2001, commonly-assigned, and incorporated herein by reference in its entirety.

FIELD OF THE INVENTION

The present invention relates to processing of video frames for use in video processing systems, for example, intelligent video surveillance (IVS) systems that are used as a part of or in conjunction with Closed Circuit Television Systems (CCTV) that are utilized in security, surveillance and related homeland security and anti-terrorism systems, IVS systems that process surveillance video in retail establishments for the purposes of establishing in-store human behavior trends for market research purposes, IVS systems that monitor vehicular traffic to detect wrong-way traffic, broken-down vehicles, accidents and road blockages, and video compression systems. IVS systems are systems that further process video after video segmentation steps to perform object classification in which foreground objects may be classified as a general class such as animal, vehicle, or other moving but-unclassified object, or may be classified in more specific classes as human, small- or large-non-human animal, automobile, aircraft, boat, truck, tree, flag, or water region. In IVS systems, once such video segmentation and classification occurs, then detected objects are processed to determine how their positions, movements and behaviors relate to user defined virtual video tripwires, and virtual regions of interest (where a region of interest may be an entire field of view, or scene). User defined events that occur will then be flagged as events of interest that will be communicated to the security officer or professional on duty. Examples of such events include a human or a vehicle crossing a virtual video tripwire, a person or vehicle loitering or entering a virtual region of interest or scene, or an object being left behind or taken away from a virtual region or scene. In particular, the present invention deals with ways of segmenting video frames into their component parts using statistical properties of regions comprising the video frames.

BACKGROUND OF THE INVENTION

In object-based video compression, video segmentation for detecting and tracking video objects, as well as in other types of object-oriented video processing, the input video is separated into two streams. One stream contains the information representing stationary background information, and the other stream contains information representing the moving portions of the video, to be denoted as foreground information. The background information is represented as a background model, including a scene model, i.e., a composite image composed from a series of related images, as, for example, one would find in a sequence of video frames; the background model may also contain additional models and modeling information. Scene models are generated by aligning images (for example, by matching points and/or regions) and determining overlap among them; generation of scene models is discussed in further depth in commonly-assigned U.S. patent application Ser. No. 09/472,162, filed Dec. 27, 1999, and Ser. No. 09/609,919, filed Jul. 3, 2000, both incorporated by reference in their entireties herein. In an efficient transmission or storage scheme, the scene model need be transmitted only once, while the foreground information is transmitted for each frame. For example, in the case of an observer (i.e., camera or the like, which is the source of the video) that undergoes only pan, tilt, roll, and zoom types of motion, the scene model need be transmitted only once because the appearance of the scene model does not change from frame to frame, except in a well-defined way based on the observer motion, which can be easily accounted for by transmitting motion parameters. Note that such techniques are also applicable in the case of other forms of motion, besides pan, tilt, roll, and zoom. In IVS systems, the creation of distinct moving foreground and background objects allows the system to attempt classification on the moving objects of interest, even when the background pixels may be undergoing apparent motion due to pan, tilt and zoom motion of the camera.

To make automatic object-oriented video processing feasible, it is necessary to be able to distinguish the regions in the video sequence that are moving or changing and to separate (i.e., segment) them from the stationary background regions. This segmentation must be performed in the presence of apparent motion, for example, as would be induced by a panning, tilting, rolling, and/or zooming observer (or due to other motion-related phenomena, including actual observer motion). To account for this motion, images are first aligned; that is, corresponding locations in the images (i.e., frames) are determined, as discussed above. After this alignment, objects that are truly moving or changing, relative to the stationary background, can be segmented from the stationary objects in the scene. The stationary regions are then used to create (or to update) the scene model, and the moving foreground objects are identified for each frame.

It is not an easy thing to identify and automatically distinguish between video objects that are moving foreground and stationary background, particularly in the presence of observer motion, as discussed above. Furthermore, to provide the maximum degree of compression or the maximum fineness or accuracy of other video processing techniques, it is desirable to segment foreground objects as finely as possible; this enables, for example, the maintenance of smoothness between successive video frames and crispness within individual frames. Known techniques have proven, however, to be difficult to utilize and inaccurate for small foreground objects and have required excessive processing power and memory. It would, therefore, be desirable to have a technique that permits accurate segmentation between the foreground and background information and accurate, crisp representations of the foreground objects, without the limitations of prior techniques.

SUMMARY OF THE INVENTION

The present invention is directed to a method for segmentation of video into foreground information and background information, based on statistical properties of the source video. More particularly, the method is based on creating and updating statistical information pertaining to a characteristic of regions of the video and the labeling of those regions (i.e., as foreground or background) based on the statistical information. For example, in one embodiment, the regions are pixels, and the characteristic is chromatic intensity. Many other possibilities exist, as will become apparent. In more particular embodiments, the invention is directed to methods of using the inventive video segmentation methods to implement intelligent video surveillance systems.

In embodiments of the invention, a background model is developed containing at least two components. A first component is the scene model, which may be built and updated, for example, as discussed in the aforementioned U.S. patent applications. A second component is a background statistical model.

In a first embodiment, the inventive method comprises a two-pass process of video segmentation. The two passes of the embodiment comprise a first pass in which a background statistical model is built and updated and a second pass in which regions in the frames are segmented. An embodiment of the first pass comprises steps of aligning each video frame with a scene model and updating the background statistical model based on the aligned frame data. An embodiment of the second pass comprises, for each frame, steps of labeling regions of the frame and performing spatial filtering.

In a second embodiment, the inventive method comprises a one-pass process of video segmentation. The single pass comprises, for each frame in a frame sequence of a video stream, steps of aligning the frame with a scene model; building a background statistical model; labeling the regions of the frame, and performing spatial/temporal filtering.

In yet another embodiment, the inventive method comprises a modified version of the aforementioned one-pass process of video segmentation. This embodiment is similar to the previous embodiment, except that the step of building a background statistical model is replaced with a step of building a background statistical model and a secondary statistical model.

Each of these embodiments may be embodied in the forms of a computer system running software executing their steps and a computer-readable medium containing software representing their steps.

DEFINITIONS

In describing the invention, the following definitions are applicable throughout (including above).

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

"Video" refers to motion pictures represented in analog and/or digital form. Examples of video include video feeds from CCTV systems in security, surveillance and anti-terrorism applications, television, movies, image sequences from a camera or other observer, and computer-generated image sequences. These can be obtained from, for example, a wired or wireless live feed, a storage device, a firewire interface, a video digitizer, a video streaming server, device or software component, a computer graphics engine, or a network connection.

"Video processing" refers to any manipulation of video, including, for example, compression and editing.

A "frame" refers to a particular image or other discrete unit within a video.

BRIEF DESCRIPTION OF THE DRAWINGS

The invention will now be described in further detail in connection with the attached drawings, in which.

Note that identical objects are labeled with the same reference numerals in all of the drawings that contain them.

DETAILED DESCRIPTION OF THE INVENTION

As discussed above, the present invention is directed to the segmentation of video streams into foreground information, which corresponds to moving objects, and background information, which corresponds to the stationary portions of the video. The present invention may be embodied in a number of ways, of which three specific ones are discussed below. These embodiments are meant to be exemplary, rather than exclusive.

The ensuing discussion refers to "pixels" and "chromatic intensity;" however, the inventive method is not so limited. Rather, the processing may involve any type of region (including regions comprising multiple pixels), not just a pixel, and may use any type of characteristic measured with respect to or related to such a region, not just chromatic intensity.

1. First Embodiment—Two-Pass Segmentation

Figure 1:
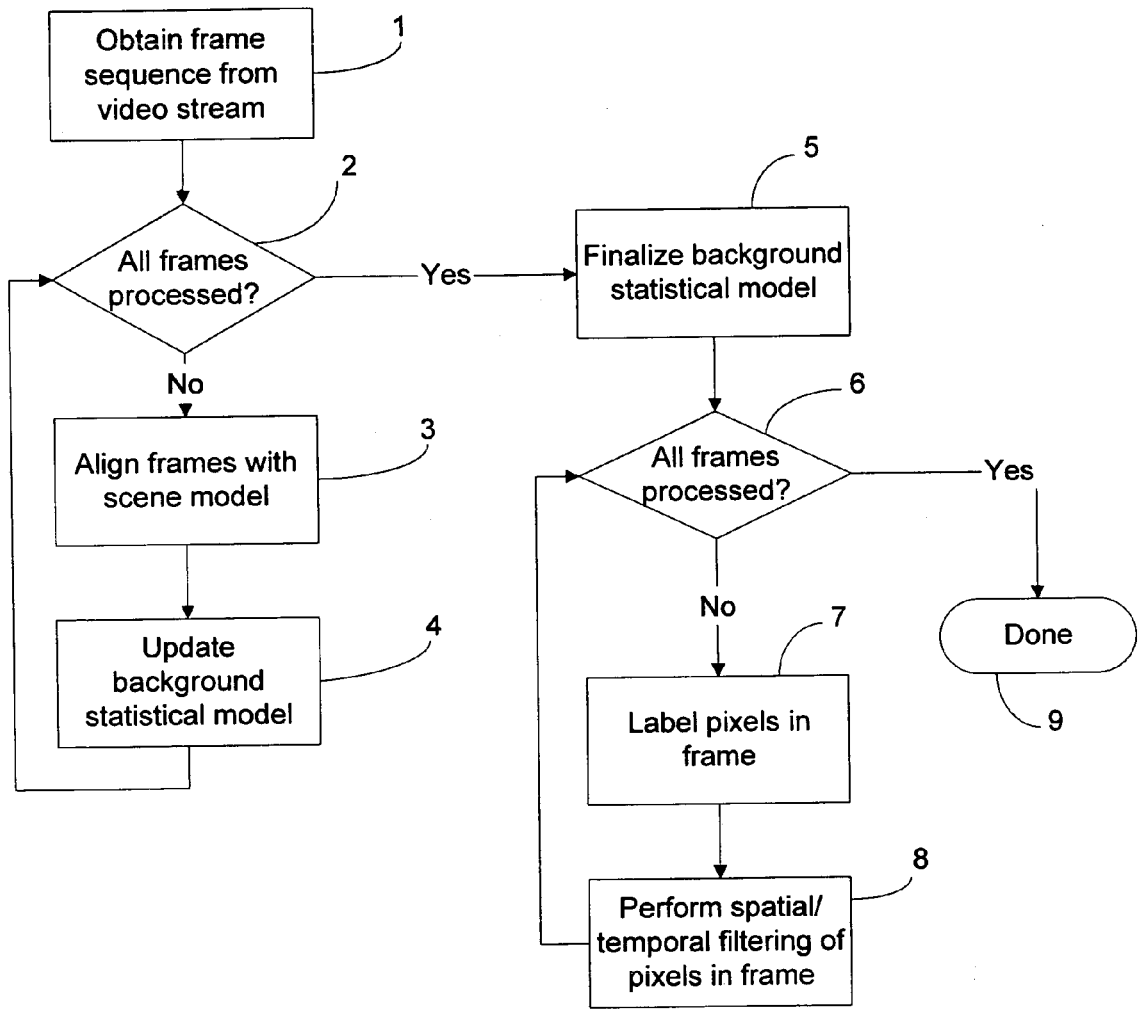
FIG. 1 shows a flowchart corresponding to an implementation of a first embodiment of the invention.

The first embodiment of the invention is depicted in FIG. 1 and corresponds to a two-pass method of segmentation. As shown in FIG. 1, the method begins by obtaining a frame (or video) sequence from a video stream (Step 1). The frame sequence preferably includes two or more frames of the video stream. The frame sequence can be, for example, a portion of the video stream or the entire video stream. As a portion of the video stream, the frame sequence can be, for example, one continuous sequence of frames of the video stream or two or more discontinuous sequences of frames of the video stream. As part of the alignment step, the scene model is also built and updated.

After Step 1, in Step 2, it is determined whether or not all frames have yet been processed. If not, the next frame is taken and aligned with the underlying scene model of the video stream (Step 3); such alignment is discussed above, and more detailed discussions of alignment techniques may be found, for example, in commonly-assigned U.S. patent application Ser. No. 09/472,162, filed Dec. 27, 1999, and Ser. No. 09/609,919, filed Jul. 3, 2000, both incorporated by reference in their entireties herein, as discussed above, as well as in numerous other references.

The inventive method is based on the use of statistical modeling to determine whether a particular pixel should be classified as being a foreground object or a part thereof or as being the background or a part thereof. Step 4 deals with the building and updating of a statistical model of the background, using each frame aligned in Step 3.

The statistical model of the present invention comprises first- and second-order statistics. In the ensuing discussion, mean and standard deviation will be used as such first- and second-order statistics; however, this is meant to be merely exemplary of the statistics that may be used.

In general, the mean of N samples, $\bar{x}$, is computed by taking the sum of the samples and dividing it by N, i.e., $$\bar{x} = \frac{\sum_{i=1}^{N} x_i}{N}, \quad (1)$$

where $x_i$ is a particular sample corresponding to a given pixel (or region), which in the present case could be, for example, the measured chromatic intensity of the $i^{th}$ sample corresponding to the given pixel (or region). In the present setting, then, such a mean would be computed for each pixel or region.

While Eqn. (1) gives the general formula for a sample mean, it may not always be optimal to use this formula. In video processing applications, a pixel's sample value may change drastically when an object moves through the pixel and change (drastically) back to a value around its previous value after the moving object is no longer within that pixel. In order to address this type of consideration, the invention utilizes a weighted average, in which the prior values are weighted more heavily than the present value. In particular, the following equation may be used:

$$\bar{x}_N = W_p \bar{x}_{N-1} + W_n x_N, \quad (2)$$

where $W_p$ is the weight of the past values and $W_n$ is the weight assigned to the newest value. Additionally, $\bar{x}_J$ represents the weighted average taken over J samples, and $x_K$ represents the $K^{th}$ sample. $W_p$ and $W_n$ may be set to any pair of values between zero and one such that their sum is one and such that $W_n < W_p$, so as to guarantee that the past values are more heavily weighted than the newest value. As an example, the inventors have successfully used $W_p = 0.9$ and $W_n = 0.1$.

Standard deviation, $\sigma$, is determined as the square root of the variance, $\sigma^2$, of the values under consideration. In general, variance is determined by the following formula:

$$\sigma^2 = \overline{x^2} - (\bar{x})^2, \quad (3)$$

where $\overline{x^2}$ represents the average of $x^2$; thus, the standard deviation is given by $$\sigma = \sqrt{\overline{x^2} - (\bar{x})^2}. \quad (4)$$

Because the inventive method uses running statistics, this becomes $$\sigma_N = \sqrt{\{\overline{x^2}\}_N - (\overline{x_N})^2}, \quad (4a)$$

where $\overline{x_N}$ is as defined in Eqn. (2) above, and $\{\overline{x^2}\}_N$ is defined as the weighted ave of the squared values of the samples, through the $N^{th}$ sample, and is given by $$\{\overline{x^2}\}_N = W_P \{\overline{x^2}\}_{N-1} + W_n x_N^2. \quad (5)$$

As in the case of the weighted average of the sample values, the weights are used to assure that past values are more heavily weighted than the present value.

Given this, Step 4 works to create and update the statistical model by computing the value of Eqn. (4a) for each pixel, for each frame. In Step 4, the values for the pixels are also stored on a pixel-by-pixel basis (as opposed to how they are received, i.e., on a frame-by-frame basis); that is, an array of values is compiled for each pixel over the sequence of frames. Note that in an alternative embodiment, Step 4 only performs this storage of values.

Following Step 4, the method returns to Step 2 to check whether or not all of the frames have been processed. If they have, then the method proceeds to Step 5, which commences the second pass of the embodiment.

In Step 5, the statistical background model is finalized. This is done by using the stored values for each pixel and determining their mode, the mode being the value that occurs most often. This may be accomplished, for example, by taking a histogram of the stored values and selecting the value for which the histogram has the highest value. The mode of each pixel is then assigned as the value of the background statistical model for that pixel.

Following Step 5, the method proceeds to Step 6, which determines whether or not all of the frames have been processed yet. If not, then the method proceeds to Step 7, in which each pixel in the frame is labeled as being a foreground (FG) pixel or a background (BG) pixel. Two alternative embodiments of the workings of this step are shown in the flowcharts of FIGS. 2a and 2b.

Figure 2A:
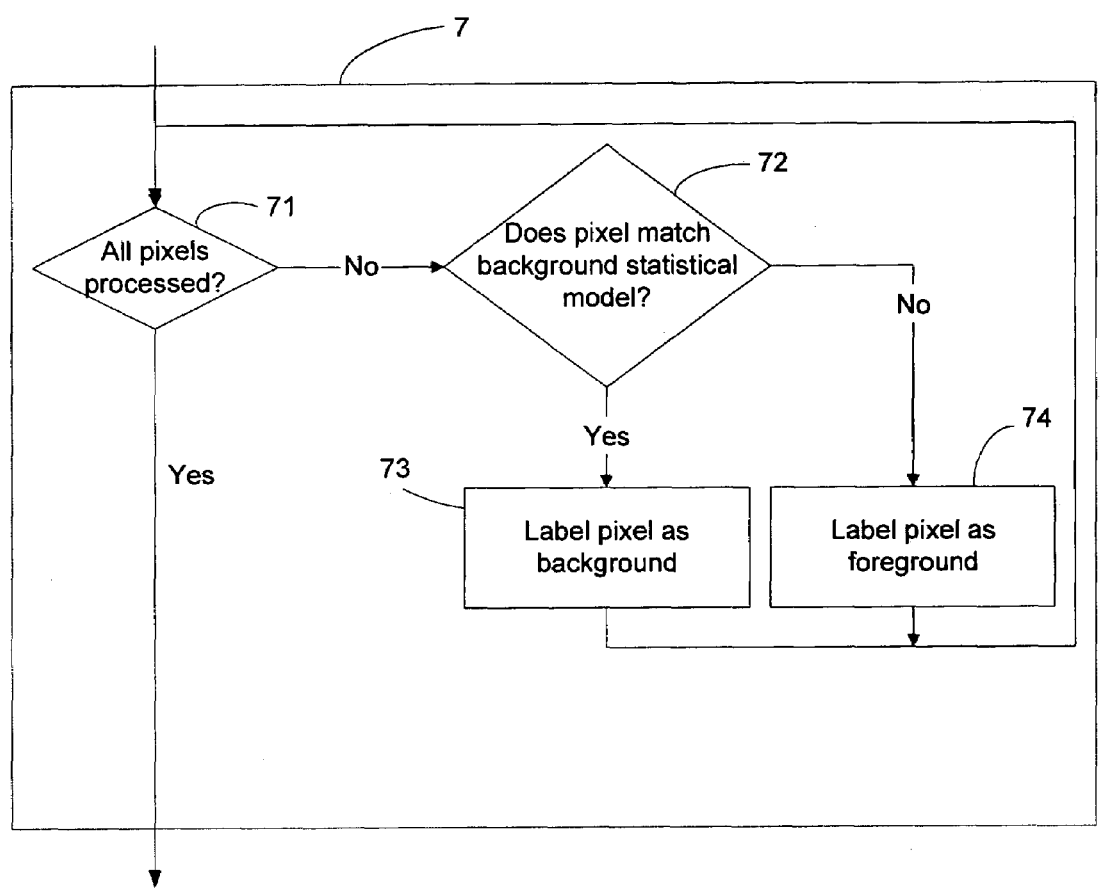
FIGS. 2a and 2b show flowcharts corresponding to two alternative embodiments of the labeling step in the flowchart of FIG. 1.
Figure 2B:
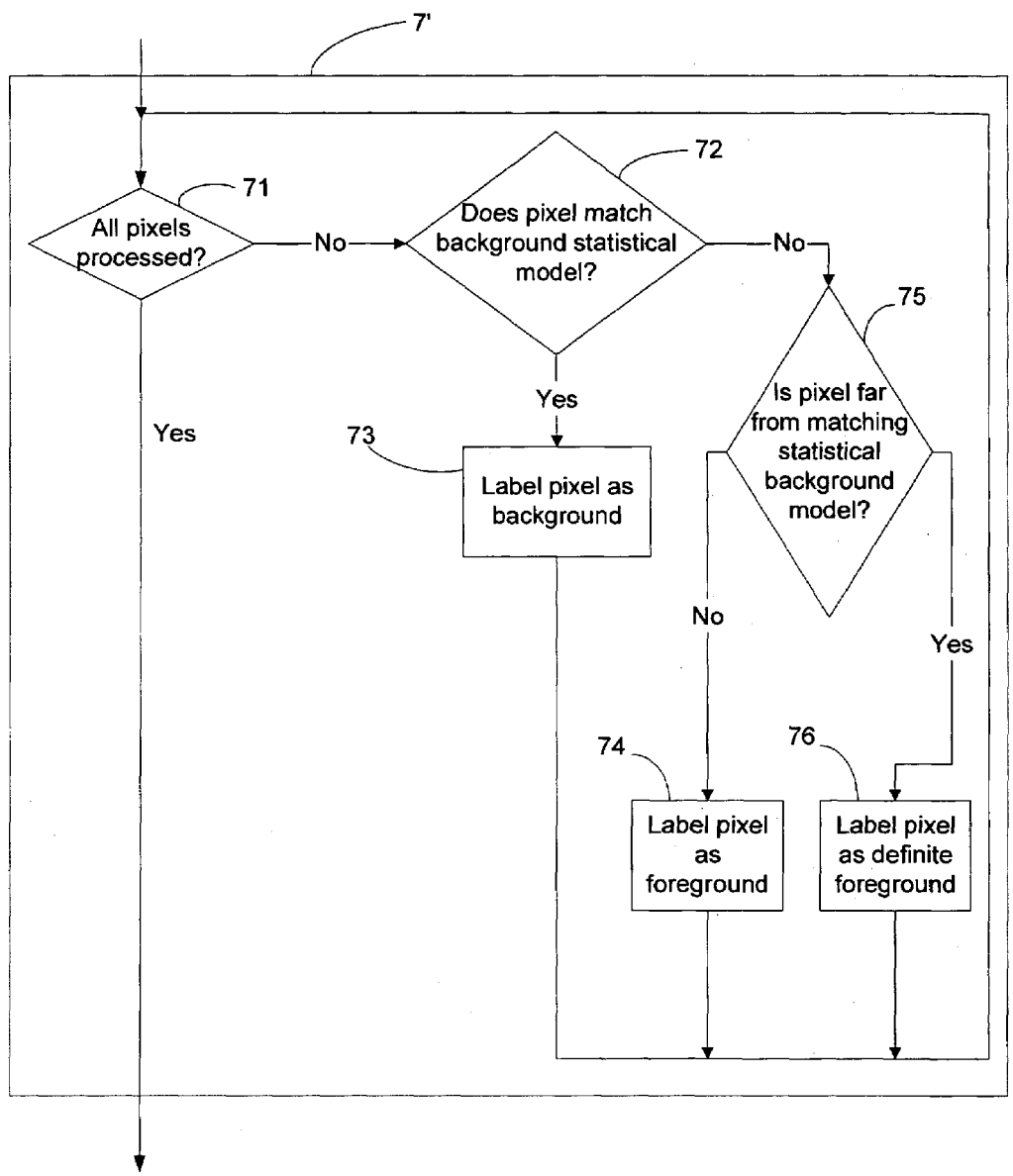

FIG. 2a depicts a two decision level method. In FIG. 2a, the pixel labeling Step 7 begins with Step 71, where it is determined whether or not all of the pixels in the frame have been processed. If not, then the method proceeds to Step 72 to examine the next pixel. Step 72 determines whether or not the pixel matches the background statistical model, i.e., whether the value of the pixel matches the mode for that pixel. This is performed by taking the absolute difference between the pixel value and the value of the background statistical model for the pixel (i.e., the mode) and comparing it with a threshold; that is, $$\Delta = |x_{pixel} - m_{pixel}| \qquad (6)$$

is compared with a threshold $\theta$. In Eqn. (6), $x_{pixel}$ denotes the value of the pixel, while $m_{pixel}$ represents the value of the statistical background model for that pixel.

The threshold $\theta$ may be determined in many ways. For example, it may be taken to be a function of standard deviation (of the given pixel), $\sigma$. In a particular exemplary embodiment, $\theta=3\sigma$; in another embodiment, $\theta=K\sigma$, where K is chosen by the user. As another example, $\theta$ may be assigned a predetermined value (again, for each pixel) or one chosen by the user.

If $\Delta \leq \theta$, then the pixel value is considered to match the background statistical model. In this case, the pixel is labeled as background (BG) in Step 73, and the algorithm proceeds back to Step 71. Otherwise, if $\Delta > \theta$, then the pixel value is considered not to match the background statistical model, and the pixel is labeled as foreground (FG) in Step 74. Again, the algorithm then proceeds back to Step 71. If Step 71 determines that all of the pixels (in the frame) have been processed, then Step 7 is finished.

FIG. 2b depicts a three decision level method, labeled 7'. In FIG. 2b, the process once again begins with Step 71, a step of determining whether or not all pixels have yet been processed. If not, the process considers the next pixel to be processed and executes Step 72, the step of determining whether or not the pixel being processed matches the background statistical model; this is done in the same way as in FIG. 2a. If yes, then the pixel is labeled as BG (Step 73), and the process loops back to Step 71. If not, then the process proceeds to Step 75; this is where the process of FIG. 2b is distinguished from that of FIG. 2a.

In Step 75, the process determines whether or not the pixel under consideration is far from matching the background statistical model. This is accomplished via a threshold test similar to Step 72, only in Step 75, $\theta$ is given a larger value. As in Step 72, $\theta$ may be user-assigned or predetermined. In one embodiment, $\theta=N\sigma$, where N is a either a predetermined or user-set number, N>K. In another embodiment, N=6.

If the result of Step 75 is that $\Delta \leq \theta$, then the pixel is labeled as FG (Step 74). If not, then the pixel is labeled definite foreground (DFG), in Step 76. In each case, the process loops back to Step 71. Once Step 71 determines that all pixels in the frame have been processed, Step 7' is complete.

Returning to FIG. 1, once all of the pixels of a frame have been labeled, the process proceeds to Step 8, in which spatial/temporal filtering is performed. While shown as a sequential step in FIG. 1, Step 8 may alternatively be performed in parallel with Step 7. Details of Step 8 are shown in the flowcharts of FIGS. 3a and 3b.

Figure 3A:
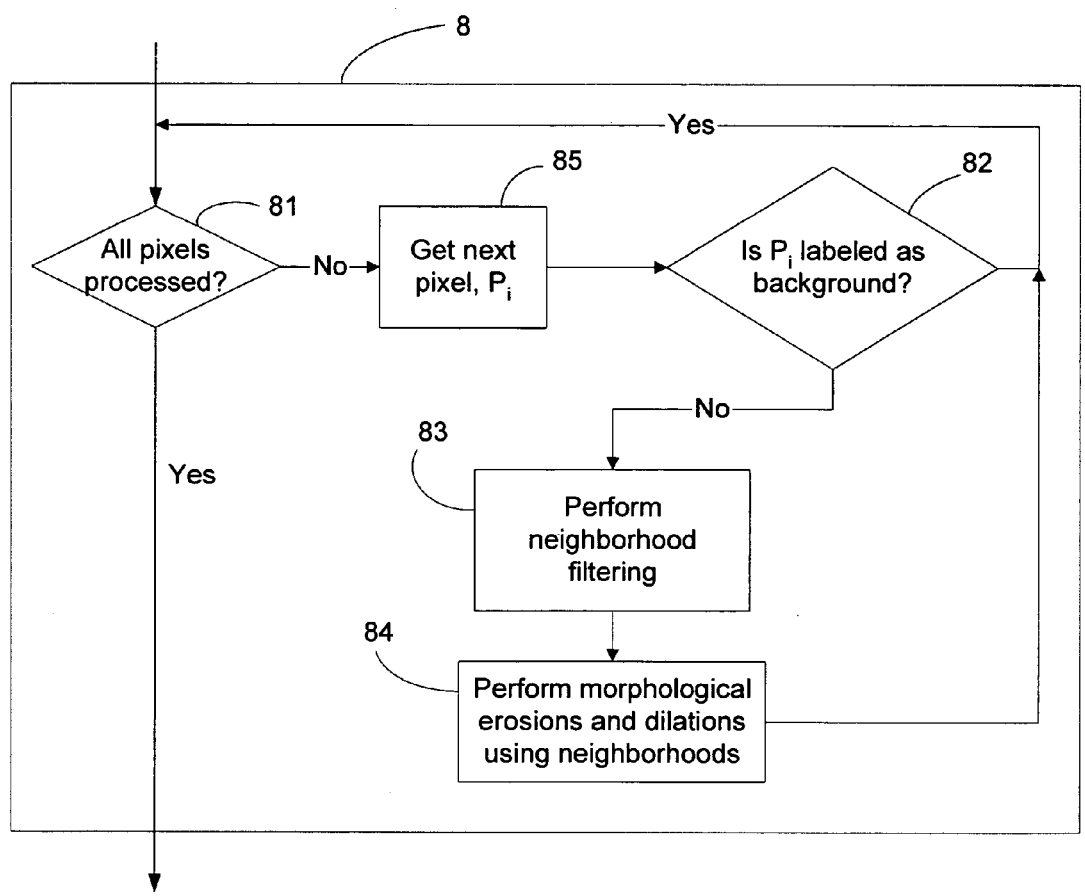
FIGS. 3a and 3b show flowcharts corresponding to implementations of the spatial/temporal filtering step in the flowchart of FIG. 1.

In FIG. 3a, Step 8 commences with a test as to whether or not all the pixels of the frame have been processed (Step 81). If not, in Step 85, the algorithm selects the next pixel, $P_i$, for processing and proceeds to Step 82, where it is determined whether or not the pixel is labeled as BG. If it is, then the process goes back to Step 81. If not, then the pixel undergoes further processing in Steps 83 and 84.

Step 83, neighborhood filtering, is used to correct for misalignments when the images are aligned. If the current image is slightly misaligned with the growing background statistical model, then, particularly near strong edges, the inventive segmentation procedure, using the background statistical model, will label pixels as foreground. Neighborhood filtering will correct for this. An embodiment of Step 83 is depicted in the flowchart of FIG. 3b.

Figure 3B:
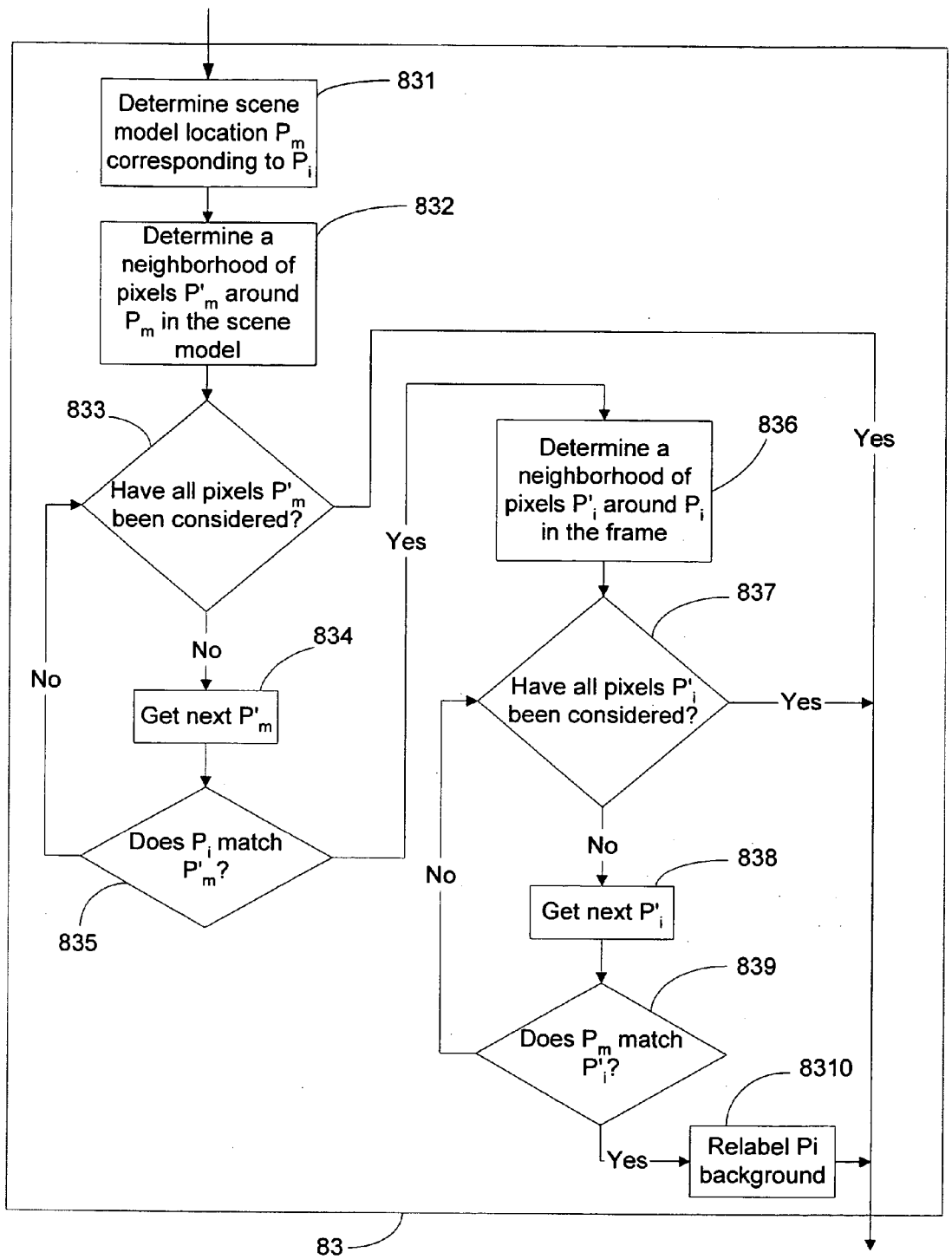

In FIG. 3b, Step 83 begins with Step 831, where a determination is made of the scene model location, $P_m$, corresponding to $P_i$. Next, a neighborhood, comprising the pixels, $P'_m$, surrounding $P_m$ in the scene model, is selected (Step 832). Step 833 next determines if all of the pixels in the neighborhood have been processed. If yes, Step 83 is complete, and the label of $P_i$ remains as it was; if not, the process proceeds to Step 834, where the next neighborhood pixel $P'_m$ is considered. Step 835 then tests to determine whether or not $P_i$ matches $P'_m$. This matching test is accomplished by executing the labeling step (Step 7 or 7') in a modified fashion, using $P_i$ as the pixel under consideration and $P'_m$ as the "corresponding" background statistical model point. If the labeling step returns a label of FG or DFG, there is no match, whereas if it returns a label of BG, there is a match. If there is no match, the process loops back to Step 833; if there is a match, then this is an indication that $P_i$ might be mislabeled, and the process continues to Step 836. In Step 836, a neighborhood, comprising the pixels, $P'_i$, surrounding $P_i$ in the frame, is selected, and an analogous process is performed. That is, in Step 833, it is determined whether or not all of the pixels, $P'_i$, in the neighborhood have yet been considered. If yes, then Step 83 is complete, and the label of $P_i$ remains as it was; if not, then the process proceeds to Step 838, where the next neighborhood pixel, $P'_i$, is considered. Step 839 tests to determine if $P_m$ matches $P'_i$; this is performed analogously to Step 833, with the $P'_i$ under consideration being used as the pixel being considered and $P_m$ as its "corresponding" background statistical model point. If it does not, then the process loops back to Step 837; if it does, then $P_i$ is relabeled as BG, and Step 83 is complete.

Returning to FIG. 3a, following Step 83, Step 84 is executed, in which morphological erosions and dilations are performed. First, a predetermined number, n, of erosions are performed to remove incorrectly labeled foreground. Note that pixels labeled DFG may not be eroded because they represent either a pixel that is almost certainly foreground. This is followed by n dilations, which restore the pixels that were correctly labeled as foreground but were eroded. Finally, a second predetermined number, m, of dilations are performed to fill in holes in foreground objects. The erosions and dilations may be performed using conventional erosion and dilation techniques, applied in accordance with user-specified parameters, and modified, as discussed above, such that pixels labeled DFG are not eroded.

In alternative embodiments, Step 84 may comprise filtering techniques other than or in addition to morphological erosions and dilations. In general, Step 84 may employ any form or forms of spatial and/or temporal filtering.

Returning to FIG. 1, following Step 8, the algorithm returns to Step 6, to determine whether or not all frames have been processed. If yes, then the processing of the frame sequence is complete, and the process ends (Step 9).

This two-pass embodiment has the advantage of relative simplicity, and it is an acceptable approach for applications not requiring immediate or low-latency processing. Examples of such applications include off-line video compression and non-linear video editing and forensic processing of security and surveillance video. On the other hand, many other applications such as video security and surveillance in which timely event reporting is critical do have such requirements, and the embodiments to be discussed below are tailored to address these requirements.

2. Second Embodiment—One-Pass Segmentation

Figure 4:
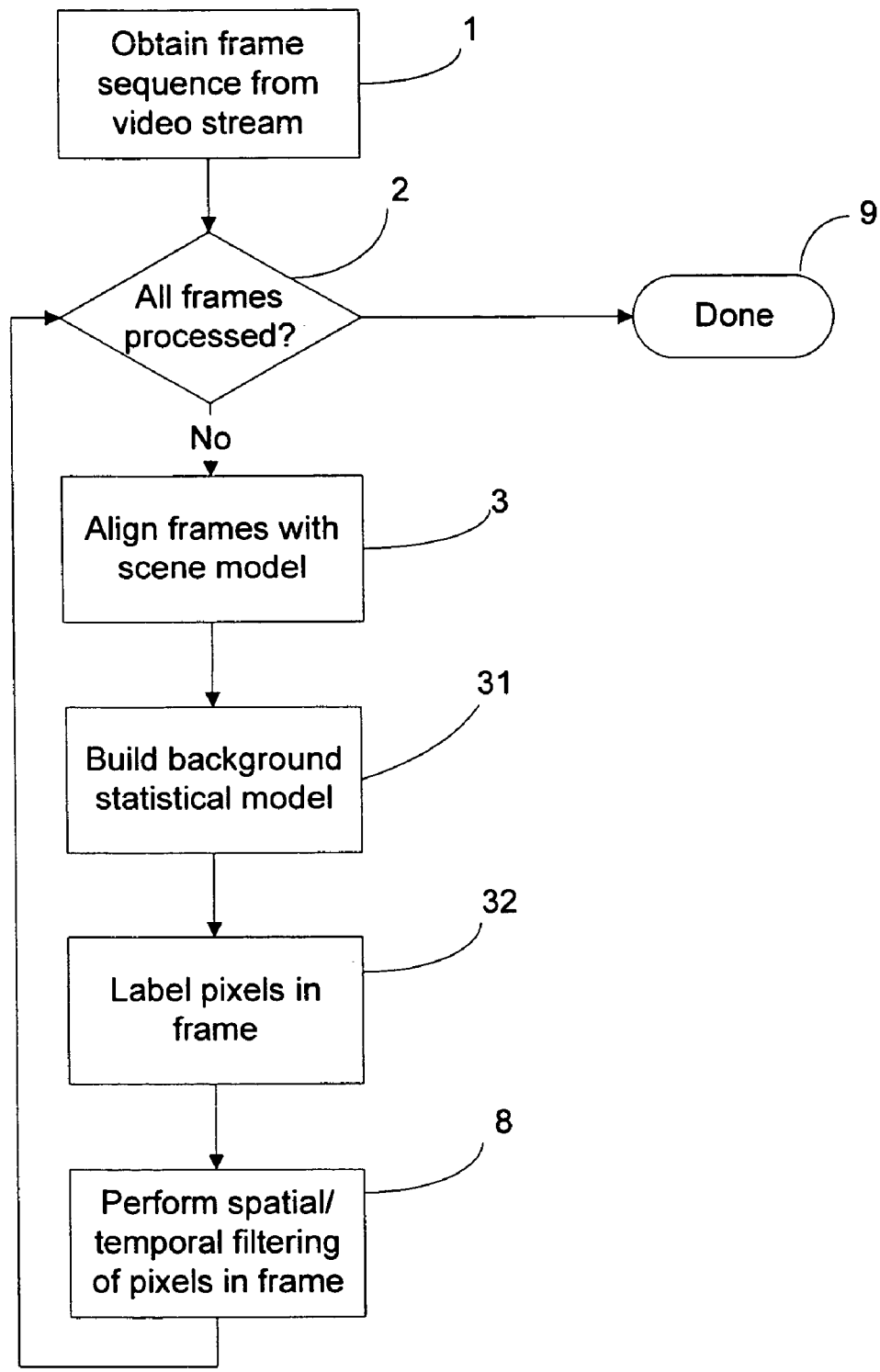
FIG. 4 shows a flowchart corresponding to an implementation of a second embodiment of the invention.

FIG. 4 depicts a flowchart of a one-pass segmentation process, according to a second embodiment of the invention. Comparing FIG. 4 with FIG. 1 (the first embodiment), the second embodiment differs in that there is only a single pass of processing for each frame sequence. This single pass, as shown in Steps 2, 3, 31, 32, 8 in FIG. 4, incorporates the processes of the second pass (Steps 5–8 in FIG. 1) with the first pass (Steps 2–4 in FIG. 1), albeit in a modified form, as will be discussed below.

As in the case of the first embodiment, the second embodiment (one-pass process), shown in FIG. 4, begins by obtaining a frame sequence (Step 1). As in the first embodiment, the process then performs a test to determine whether or not all of the frames have yet been processed (Step 2). Also as in the first embodiment, if the answer is no, then the next frame to be processed is aligned with the scene model (Step 3). As discussed above, the scene model component of the background model is built and updated as part of Step 3, so there is always at least a deterministically-determined value in the background model at each location.

At this point, the process includes a step of building a background statistical model (Step 31). This differs from Step 4 of FIG. 1, and is depicted in further detail in FIG. 5. The process begins with a step of determining whether or not all pixels in the frame being processed have been processed (Step 311). If not, then the process determines whether or not the background statistical model is "mature" (Step 312) and "stable" (Step 313).

The reason for Steps 312 and 313 is that, initially, the statistical background model will not be sufficiently developed to make accurate decisions as to the nature of pixels. To overcome this, some number of frames should be processed before pixels are labeled (i.e., the background statistical model should be "mature"); in one embodiment of the present invention, this is a user-defined parameter. This may be implemented as a "look-ahead" procedure, in which a limited number of frames are used to accumulate the background statistical model prior to pixel labeling (Step 32 in FIG. 4).

While simply processing a user-defined number of frames may suffice to provide a mature statistical model, stability is a second concern (Step 313), and it depends upon the standard deviation of the background statistical model. In particular, as will be discussed below, the statistical background model includes a standard deviation for each pixel. The statistical model (for a particular pixel) is defined as having become "stable" when its variance (or, equivalently, its standard deviation) is reasonably small. In an embodiment of the present invention, Step 313 determines this by comparing the standard deviation with a user-defined threshold parameter; if the standard deviation is less than this threshold, then the statistical background model (for that pixel) is determined to be stable.

Figure 5:
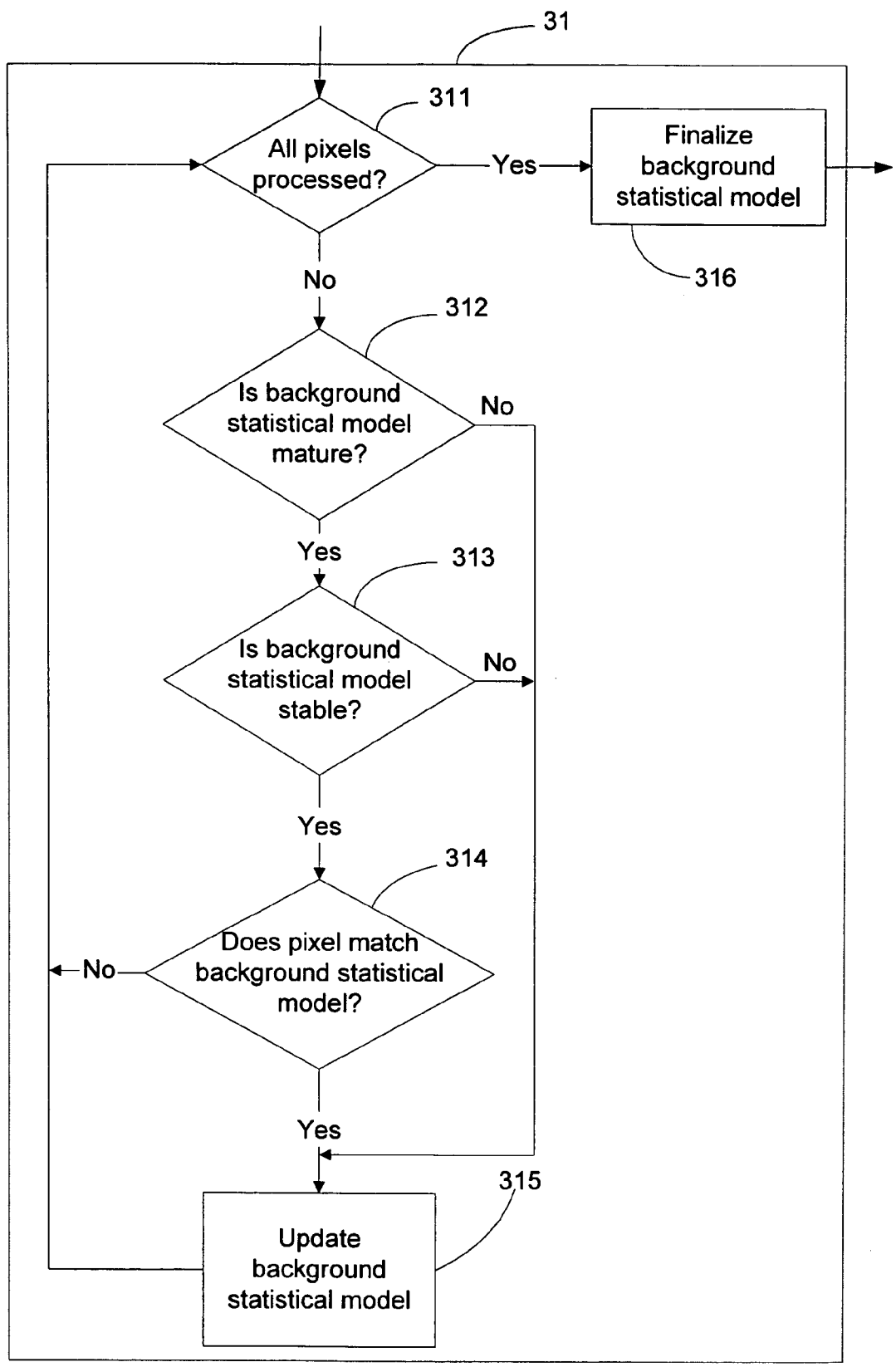
FIG. 5 shows a flowchart corresponding to an implementation of one of the steps in the flowchart of FIG. 4.

As to the flow of Step 31, in FIG. 5, if the background statistical model is determined to be mature (Step 312), it is determined whether or not the background statistical model is stable (Step 313). If either of these tests (Steps 312 and 313) fails, the process proceeds to Step 315, in which the background statistical model of the pixel being processed is updated using the current value of that pixel. Step 315 will be explained further below.

If the background statistical model is determined to be both mature and stable (in Steps 312 and 313), the process proceeds to Step 314, where it is determined whether or not the pixel being processed matches the background statistical model. If yes, then the background statistical model is updated using the current pixel value (Step 315); if no, then the process loops back to Step 311 to determine if all pixels in the frame have been processed.

Step 314 operates by determining whether or not the current pixel value is within some range of the mean value of the pixel, according to the current background statistical model. In one embodiment of the invention, the range is a user-defined range. In yet another embodiment, it is determined to be a user-defined number of standard deviations; i.e., the pixel value, x, matches the background statistical model if $$|x_{pixel} - \overline{x_{pixel}}| \leq K\sigma, \quad (7)$$

where K is the user-defined number of standard deviations, $\sigma$; $x_{pixel}$ is the current pixel value; and $\overline{x_{pixel}}$ is the mean value of the current pixel in the background statistical model. The purpose of performing Step 314 is to ensure, to the extent possible, that only background pixels are used to develop and update the background statistical model.

In Step 315, the background statistical model is updated. In this embodiment, the background statistical model consists of the mean and standard deviation of the values for each pixel (over the sequence of frames). These are computed according to Eqns. (2) and (4a) above.

Following Step 315, the process loops back to Step 311, to determine if all pixels (in the current frame) have been processed. Once all of the pixels have been processed, the process proceeds to Step 316, where the background statistical model is finalized. This finalization consists of assigning to each pixel its current mean value and standard deviation (i.e., the result of processing all of the frames up to that point).

Note that it is possible for the background statistical model for a given pixel never to stabilize. This generally indicates that the particular pixel is not a background pixel in the sequence of frames, and there is, therefore, no need to assign it a value for the purposes of the background statistical model. Noting that, as discussed above, a scene model is also built and updated, there is always at least a deterministically-determined value associated with each pixel in the background model.

Following Step 316, the process goes to Step 32, as shown in FIG. 4, where the pixels in the frame are labeled according to their type (i.e., definite foreground, foreground or background). Step 32 is shown in further detail in the flowchart of FIGS. 6a and 6b.

The following concepts are embodied in the description of Step 32 to follow. Ideally, labeling would always be done by testing each pixel against its corresponding point in the background statistical model, but this is not always possible. If the background statistical model is not ready to use on the basis of number of frames processed (i.e., "mature"), then the process must fall back on testing against the corresponding point in the scene model. If the background statistical model is ready to use but has not yet settled down (i.e., is not "stable"), this is a sign that the pixel is varying and should be labeled as being foreground. If the background statistical model has, for some reason (i.e., because it fails to match the scene model or because it has become unsettled again), become unusable, the process must once again fall back on testing against the scene model.

Figure 6A:
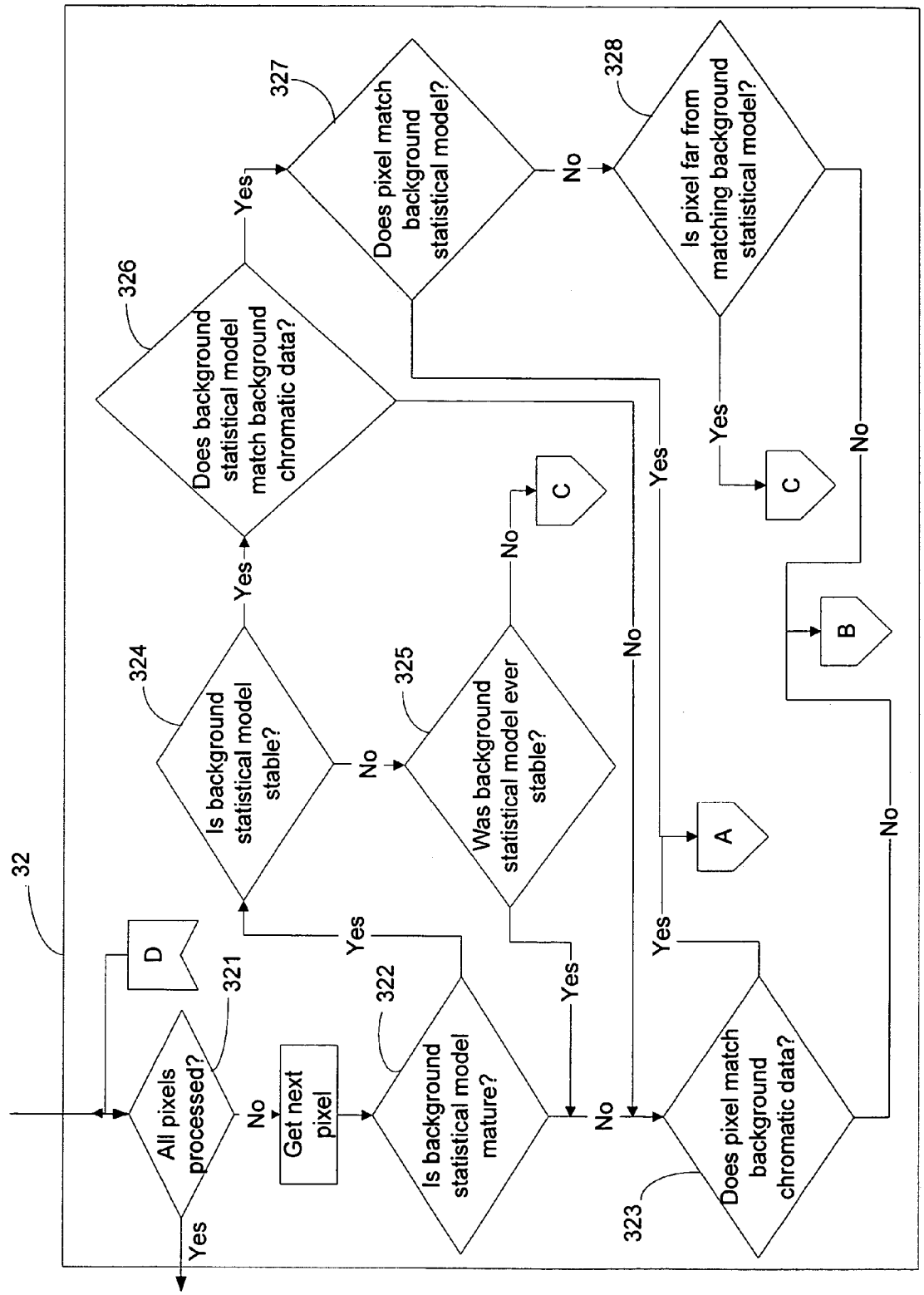
FIGS. 6a and 6b together show a flowchart corresponding to an implementation of another one of the steps in the flowchart of FIG. 4.

As shown in FIG. 6a, Step 32 begins with Step 321, where it is determined whether or not all pixels (in the current frame) have been processed. If yes, Step 32 is complete; if not, the next pixel is processed in Steps 322 et seq.

Step 322 determines whether or not the background statistical model is mature. This is done in the same manner as in Step 312 of FIG. 5, discussed above. If not, the process proceeds to Step 323, where it is determined whether or not the pixel matches the background chromatic data of the corresponding point of the scene model.

Step 323 is performed by carrying out a test to determine whether or not the given pixel falls within some range of the background chromatic data value. This is analogous to Step 314 of FIG. 5, substituting the background chromatic data value for the statistical mean. The threshold may be determined in a similar fashion (predetermined, user-determined, or the like).

Figure 6B:
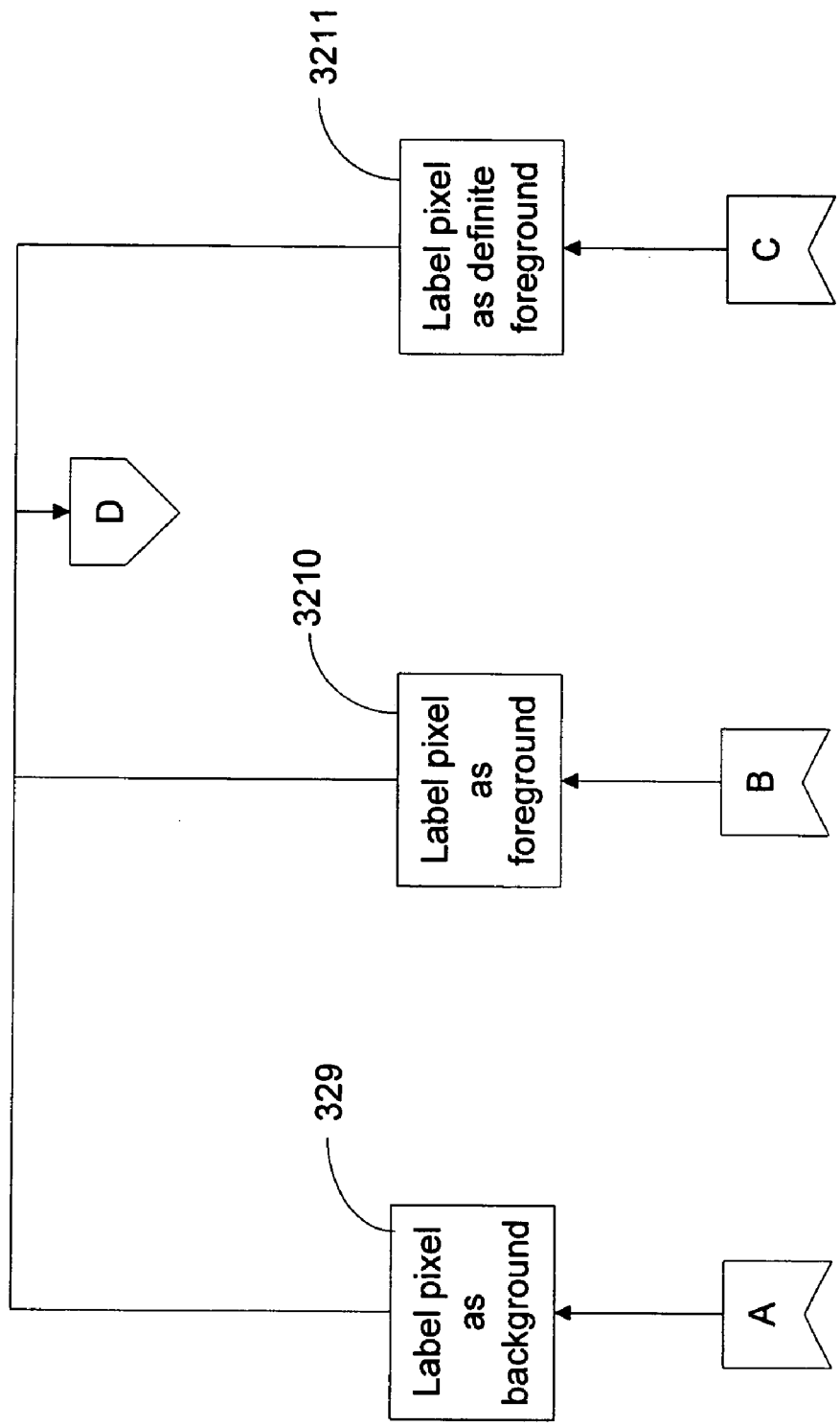

If Step 323 determines that the pixel does match the background chromatic data, then the pixel is labeled BG (following connector A) in Step 329 of FIG. 6b. From Step 329, the process loops back (via connector D) to Step 321.

If Step 323 determines that the pixel does not match the background chromatic data, then the pixel is labeled FG (following connector B) in Step 3210 of FIG. 6b. From the Step 3210, the process loops back (via connector D) to Step 321.

If Step 322 determines that the background statistical model is mature, processing proceeds to Step 324, which determines whether or not the background statistical model is stable. Step 324 performs this task in the same manner as Step 313 of FIG. 5, discussed above. If not, the process proceeds to Step 325, where it is determined if the background statistical model was ever stable (i.e., if it was once stable but is now unstable). If yes, then the process branches to Step 323, and the process proceeds from there as described above. If no, the pixel is labeled DFG (following connector C) in Step 3211 of FIG. 6b, after which the process loops back (via connector D) to Step 321.

If Step 324 determines that the background statistical model is stable, the process goes to Step 326. Step 326 tests whether the background statistical model matches the background chromatic data. Similar to the previous matching tests above, this test takes an absolute difference between the value of the background statistical model (i.e., the mean) for the pixel and the background chromatic data (i.e., of the scene model) for the pixel. This absolute difference is then compared to some threshold value, as above (predetermined, user-determined, or the like).

If Step 326 determines that there is not a match between the background statistical model and the background chromatic data, the process branches to Step 323, where processing proceeds in the same fashion as described above. If Step 326, on the other hand, determines that there is a match, the process continues to Step 327.

Step 327 determines whether or not the current pixel matches the background statistical model. This step is performed in the same manner as Step 314 of FIG. 5, discussed above. If the current pixel does match (which, as discussed above, is determined by comparing it to the mean value corresponding to the current pixel), the pixel is labeled BG (following connector A) in Step 329 of FIG. 6b, and the process then loops back (via connector D) to Step 321. If not, then further testing is performed in Step 328.

Step 328 determines whether, given that the current pixel value does not reflect a BG pixel, it reflects a FG pixel or a DFG pixel. This is done by determining if the pixel value is far from matching the background statistical model. As discussed above, a FG pixel is distinguished from a BG pixel (in Step 325) by determining if its value differs from the mean by more than a particular amount, for example, a number of standard deviations (see Eqn. (7)). Step 328 applies the same test, but using a larger range. Again, the threshold may set as a predetermined parameter, as a computed parameter, or as a user-defined parameter, and it may be given in terms of a number of standard deviations from the mean, i.e., $$|x_{pixel} - \overline{x_{pixel}}| \leq N\sigma, \qquad (8)$$

where N is a number greater than K of Eqn. (7). If the pixel value lies outside the range defined, for example, by Eqn. (8), it is labeled DFG (following connector C) in Step 3211 of FIG. 6b, and the process loops back (via connector D) to Step 321. If it lies within the range, the pixel is labeled FG (following connector B) in Step 3210 of FIG. 6b, and the process proceeds (via connector D) to Step 321.

After Step 32 is complete, the process proceeds to Step 8, as shown in FIG. 4, where spatial/temporal filtering is performed on the pixels in the frame. Step 8 is implemented, in this embodiment of the invention, in the same manner in which it is implemented for the two-pass embodiment, except that the pixel labeling algorithm of FIGS. 6a and 6b is used for Steps 833 and 837 of Step 83 (as opposed to the pixel labeling algorithms used in the two-pass embodiment). Following Step 8, the process loops back to Step 2, where, if all frames have been processed, the process ends.

A single-pass approach, like the one present here, has the advantage of not requiring a second pass, thus, reducing the latency associated with the process. This is useful for applications in which high latencies would be detrimental, for example, video teleconferencing, webcasting, real-time gaming, and the like.

3. Third Embodiment—Modified One-Pass Segmentation

While the one-pass approach described above has a lower latency than the two-pass approach, it does have a disadvantage in regard to the background statistical model. In particular, the cumulative statistical modeling approach used in the one-pass embodiment of the invention may stabilize on a non-representative statistical model for an element (i.e., pixel, region, etc.; that is, whatever size element is under consideration). If the values (e.g., chromatic values) of frame elements corresponding to a particular element of the video scene fundamentally change (i.e., something happens to change the video, for example, a parked car driving away, a moving car parking, the lighting changes, etc.), then the scene model element will no longer accurately represent the true scene. This can be addressed by utilizing a mechanism for dynamically updating the background statistical model so that at any given time it accurately represents the true nature of the scene depicted in the video. Such a mechanism is depicted in the embodiment of the invention shown in FIG. 7.

Figure 7:
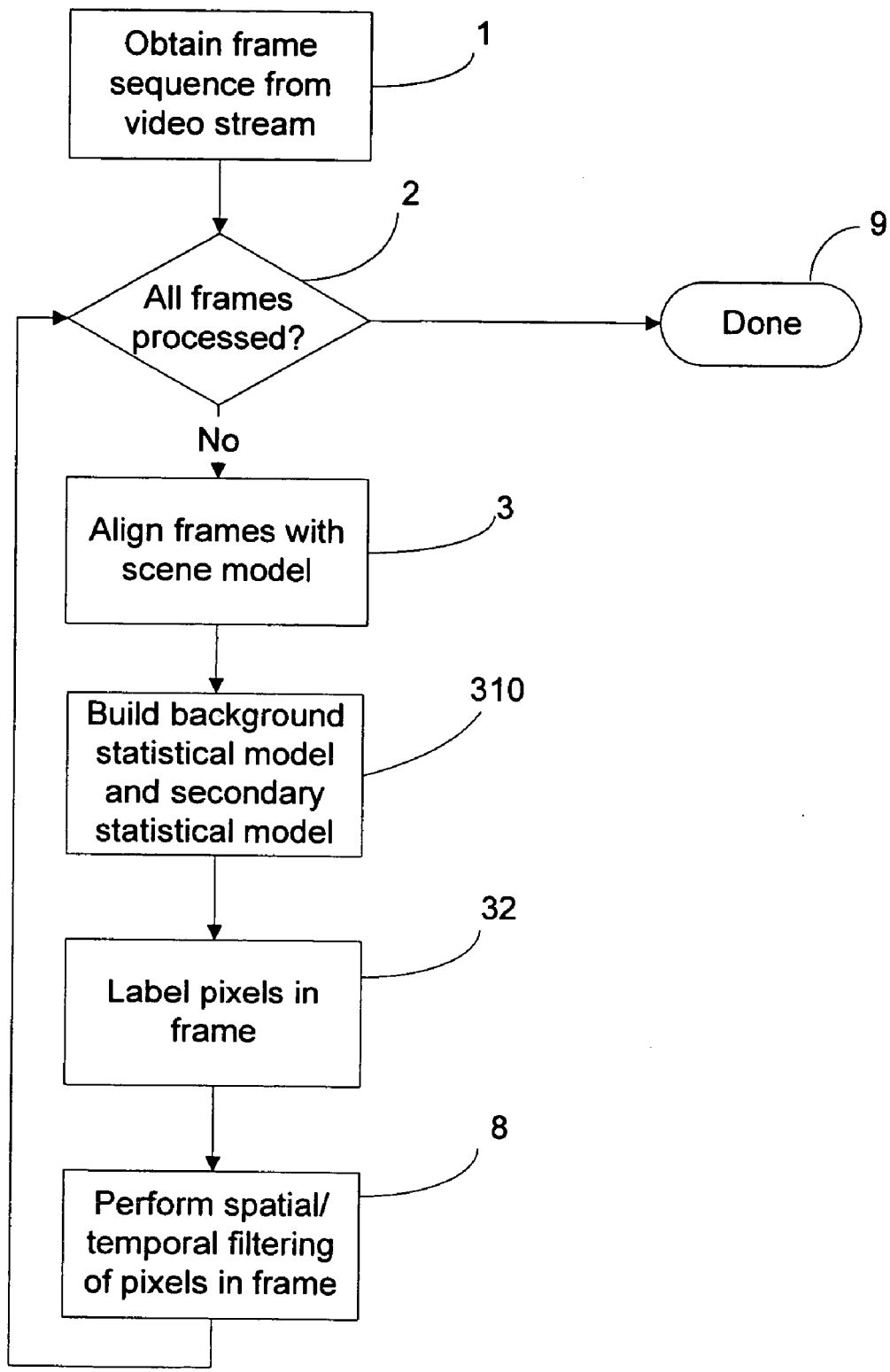
FIG. 7 shows a flowchart corresponding to an implementation of a third embodiment of the invention.

In FIG. 7, Steps 1–3, 32, 8, and 9 are as described in the one-pass embodiment above. The embodiment of FIG. 7 differs from that of FIG. 4 in that after a given frame is aligned with the scene model (Step 3), the process executes Step 310, in which the background statistical model and, simultaneously, a secondary background statistical model are built. Step 310 is more fully described in connection with FIGS. 8a and 8b.

Figure 8A:
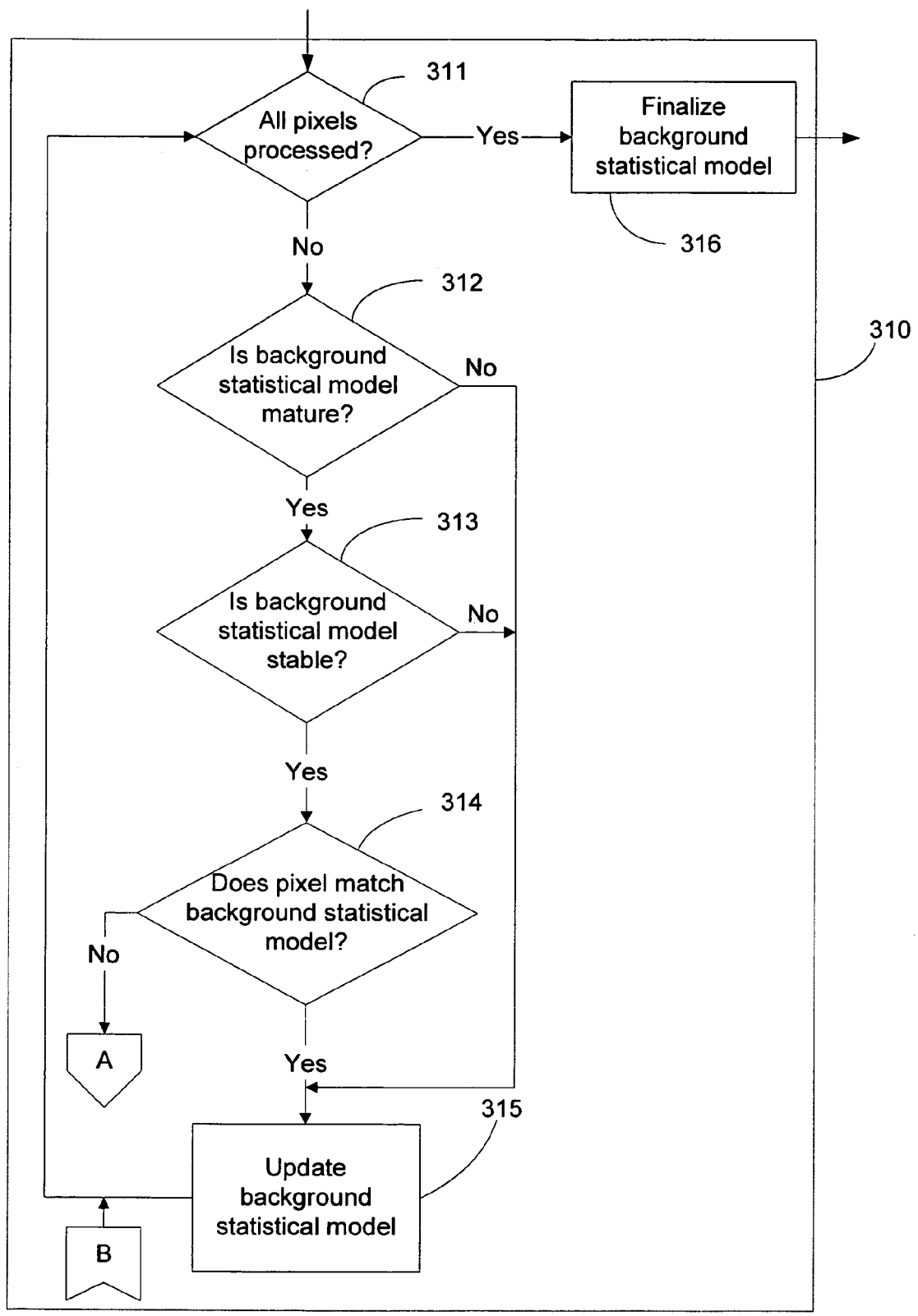
FIGS. 8a and 8b together show a flowchart corresponding to an implementation of one of the steps in the flowchart of FIG. 7.

As shown in FIG. 8a, Step 310 includes all of the steps shown in Step 31 in FIG. 5 (which are shown using the same reference numerals), and it begins with a step of determining whether or not all pixels have yet been processed (Step 311). If not, the next pixel is processed by proceeding to Step 312. In Step 312, it is determined whether or not the background statistical model is mature. If not, the process branches to Step 315, where the pixel is used to update the background statistical model. Following Step 315, the process loops back to Step 311.

If Step 312 determines that the background statistical model is mature, the process proceeds to Step 313, where it is determined whether or not the background statistical model is stable. If it is not, then, as in the case of a negative determination in Step 312, the process branches to Step 315 (and then loops back to Step 311). Otherwise, the process proceeds to Step 314.

In Step 314, it is determined whether or not the pixel under consideration matches the background statistical model. If it does, the process proceeds with Step 315 (and then loops back to Step 311); otherwise, the process executes the steps shown in FIG. 8b, which build and update a secondary background statistical model. This secondary background statistical model is built in parallel with the background statistical model, as reflected in FIG. 8b; uses the same procedures as are used to build and update the background statistical model; and represents the pixel values that do not match the background statistical model.

Following a negative determination in Step 314, the process then makes a determination as to whether or not the secondary background statistical model is mature (Step 3107). This determination is made in the same fashion as in Step 313. If not, the process branches to Step 3109, where the secondary background statistical model is updated, using the same procedures as for the background statistical model (Step 315). From Step 3109, the process loops back to Step 311 (in FIG. 8a).

If Step 3107 determines that the secondary background statistical model is mature, the process proceeds to Step 3108, which determines (using the same procedures as in Step 314) whether or not the secondary background statistical model is stable. If not, the process proceeds to Step 3109 (and from there to Step 311). If yes, then the process branches to Step 31010, in which the background statistical model is replaced with the secondary background statistical model, after which the process loops back to Step 311. Additionally, concurrently with the replacement of the background statistical model by the secondary background statistical model in Step 31010, the scene model data is replaced with the mean value of the secondary statistical model. At this point, the secondary background statistical model is reset to zero, and a new one will be built using subsequent data.

This modified one-pass embodiment has the advantage of improved statistical accuracy over the one-pass embodiment, and it solves the potential problem of changing background images. It does this while still maintaining improved latency time over the two-pass embodiment, and at only a negligible decrease in processing speed compared with the one-pass embodiment.

4. Additional Embodiments and Remarks

While the above discussion considers two-level and three-level pixel labeling algorithms, this embodiment is not limited only to these cases. Indeed, it is contemplated that an arbitrary number of decision levels, corresponding to different ranges (i.e., threshold values) may be used. In such a case, fuzzy or soft-decision logic would be used to make decisions in subsequent steps of the segmentation process.

The above discussion primarily discusses pixels and chromatic values (which may be RGB, YUV, intensity, etc.); however, as discussed above, the invention is not limited to these quantities. Regions other than pixels may be used, and quantities other than chromatic values may be used.

Figure 9:
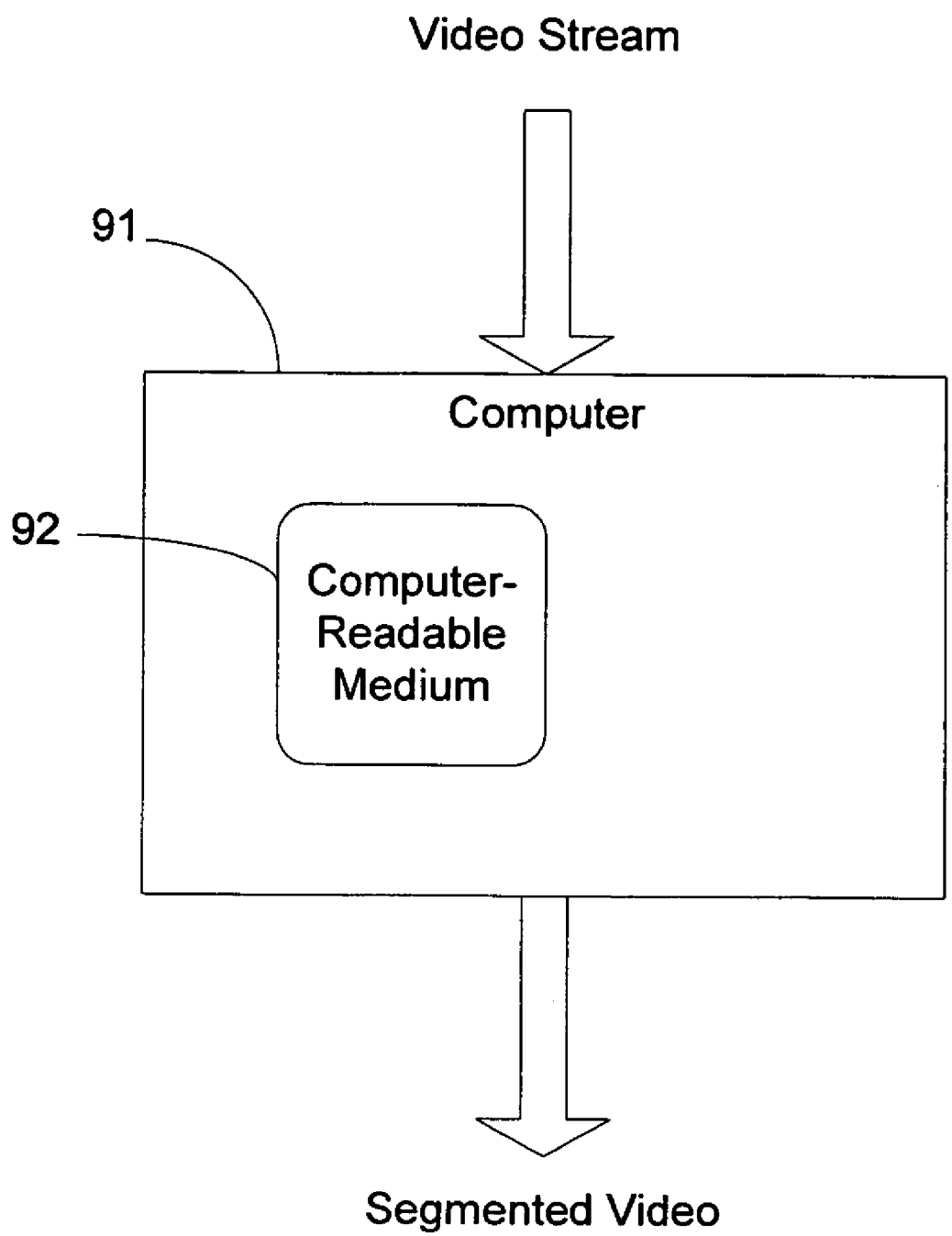
FIG. 9 depicts an embodiment of the invention in the form of software embodied on a computer-readable medium, which may be part of a computer system.

As discussed above, the invention, including all of the embodiments discussed in the preceding sections, may be embodied in the form of a computer system or in the form of a computer-readable medium containing software implementing the invention. This is depicted in FIG. 9, which shows a plan view for a computer system for the invention. The computer 91 includes a computer-readable medium 92 embodying software for implementing the invention and/or software to operate the computer 91 in accordance with the invention. Computer 91 receives a video stream and outputs segmented video, as shown. Alternatively, the segmented video may be further processed within the computer.

Figure 10:
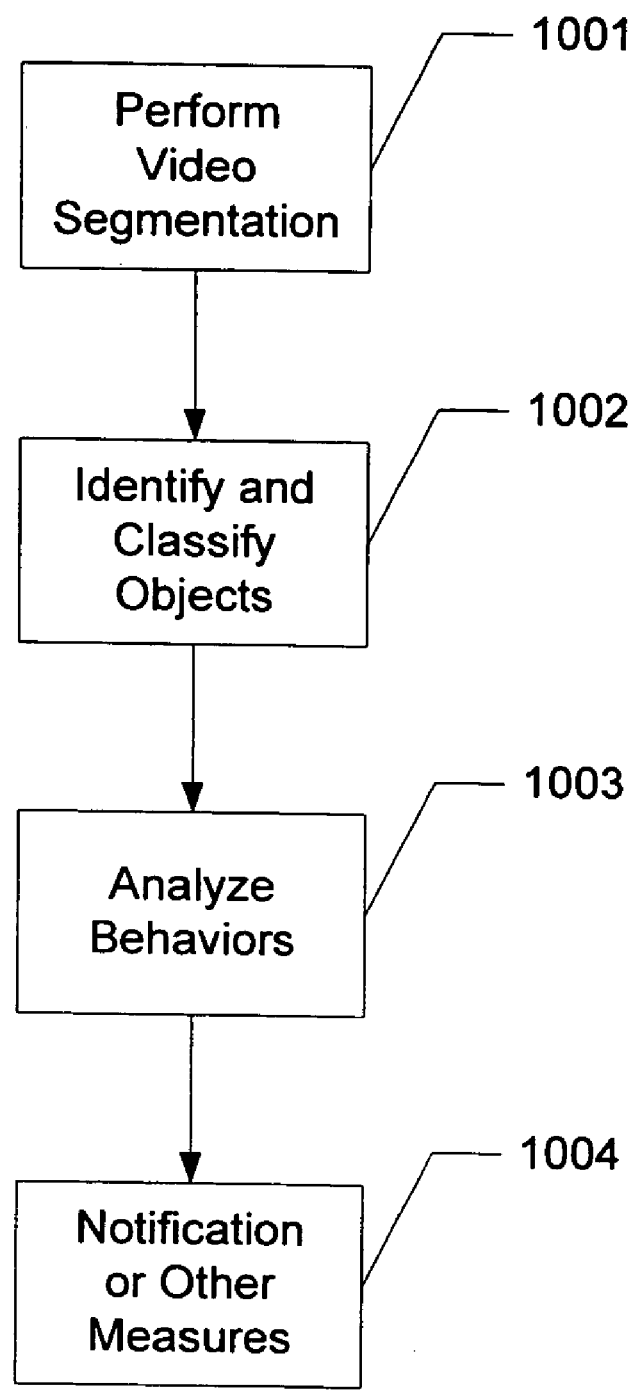
FIG. 10 depicts a flowchart of a method of implementing an intelligent video surveillance system according to an embodiment of the invention.

Also as discussed above, the statistical pixel modeling methods described above may be incorporated into a method of implementing an intelligent video surveillance system. FIG. 10 depicts an embodiment of such a method. In particular, block 1001 represents the use of statistical pixel modeling, e.g., as described above. Once the statistical pixel modeling has been completed, block 1002 uses the results to identify and classify objects. Block 1002 may use, for example, statistical or template-oriented methods for performing such identification and classification. In performing identification and classification, it is determined whether or not a given object is an object of interest; for example, one may be interested in tracking the movements of people through an area under surveillance, which would make people "objects of interest." In Block 1003, behaviors of objects of interest are analyzed; for example, it may be determined if a person has entered a restricted area. Finally, in Block 1004, if desired, various notifications may be sent out or other appropriate actions taken.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

We claim:

1. A method of implementing an intelligent video surveillance system, comprising:
   obtaining a frame sequence from an input video stream;
   executing a first-pass method for each frame of the frame sequence, the first-pass method comprising the steps of:
      aligning the frame with a scene model; and
      updating a background statistical model;
   finalizing the background statistical model;

executing a second-pass method for each frame of the frame sequence, the second-pass method comprising the steps of:
  labeling each region of the frame; and
  performing spatial/temporal filtering of the regions of the frame;
identifying and classifying objects using the labeled and filtered regions; and
analyzing behaviors of at least one of the objects.

2. A computer-readable medium comprising software implementing the method of claim 1.

3. An intelligent video surveillance system comprising a computer system comprising:
  a computer; and
  a computer-readable medium according to claim 2.

4. A method of implementing an intelligent video surveillance system, comprising:
  obtaining a frame sequence from a video stream;
  for each frame in the frame sequence, performing the following steps:
    aligning the frame with a scene model;
    building a background statistical model;
    labeling the regions of the frame; and
    performing spatial/temporal filtering;
  identifying and classifying objects based on the results of the labeling and filtering; and
  analyzing behaviors of at least one object.

5. A computer-readable medium comprising software implementing the method of claim 4.

* * * * *

UNITED STATES PATENT AND TRADEMARK OFFICE
CERTIFICATE OF CORRECTION

PATENT NO. : 7,224,852 B2      Page 1 of 10
APPLICATION NO. : 10/667148
DATED : May 29, 2007
INVENTOR(S) : Lipton et al.

It is certified that error appears in the above-identified patent and that said Letters Patent is hereby corrected as shown below:

Please DELETE Col. 1 Line 1 through Col. 16 Line 12 and INSERT Col. 1 Line 1 through Col. 18 Line 48 as attached Signed and Sealed this Thirteenth Day of January, 2009

JON W. DUDAS
*Director of the United States Patent and Trademark Office*

VIDEO SEGMENTATION USING STATISTICAL PIXEL MODELING

CROSS-REFERENCE TO RELATED APPLICATION

This application is a continuation-in-part of U.S. application Ser. No. 09/815,385 now Pat. No. 6,625,310, filed on Mar. 23, 2001, commonly-assigned, and incorporated herein by reference in its entirety.

FIELD OF THE INVENTION

The present invention relates to processing of video frames for use in video processing systems, for example, intelligent video surveillance (IVS) systems that are used as a part of or in conjunction with Closed Circuit Television Systems (CCTV) that are utilized in security, surveillance and related homeland security and anti-terrorism systems, IVS systems that process surveillance video in retail establishments for the purposes of establishing in-store human behavior trends for market research purposes, IVS systems that monitor vehicular traffic to detect wrong-way traffic, broken-down vehicles, accidents and road blockages, and video compression systems. IVS systems are systems that further process video after video segmentation steps to perform object classification in which foreground objects may be classified as a general class such as animal, vehicle, or other moving but-unclassified object, or may be classified in more specific classes as human, small- or large-non-human animal, automobile, aircraft, boat, truck, tree, flag, or water region. In IVS systems, once such video segmentation and classification occurs, then detected objects are processed to determine how their positions, movements and behaviors relate to user defined virtual video tripwires, and virtual regions of interest (where a region of interest may be an entire field of view, or scene). User defined events that occur will then be flagged as events of interest that will be communicated to the security officer or professional on duty. Examples of such events include a human or a vehicle crossing a virtual video tripwire, a person or vehicle loitering or entering a virtual region of interest or scene, or an object being left behind or taken away from a virtual region or scene. In particular, the present invention deals with ways of segmenting video frames into their component parts using statistical properties of regions comprising the video frames.

BACKGROUND OF THE INVENTION

In object-based video compression, video segmentation for detecting and tracking video objects, as well as in other types of object-oriented video processing, the input video is separated into two streams. One stream contains the information representing stationary background information, and the other stream contains information representing the moving portions of the video, to be denoted as foreground information. The background information is represented as a background model, including a scene model, i.e., a composite image composed from a series of related images, as, for example, one would find in a sequence of video frames; the background model may also contain additional models and modeling information. Scene models are generated by aligning images (for example, by matching points and/or regions) and determining overlap among them; generation of scene models is discussed in further depth in commonly-assigned U.S. patent application Ser. No. 09/472,162, filed Dec. 27, 1999, and Ser. No. 09/609,919, filed Jul. 3, 2000, both incorporated by reference in their entireties herein. In an efficient transmission or storage scheme, the scene model need be transmitted only once, while the foreground information is transmitted for each frame. For example, in the case of an observer (i.e., camera or the like, which is the source of the video) that undergoes only pan, tilt, roll, and zoom types of motion, the scene model need be transmitted only once because the appearance of the scene model does not change from frame to frame, except in a well-defined way based on the observer motion, which can be easily accounted for by transmitting motion parameters. Note that such techniques are also applicable in the case of other forms of motion, besides pan, tilt, roll, and zoom. In IVS systems, the creation of distinct moving foreground and background objects allows the system to attempt classification on the moving objects of interest, even when the background pixels may be undergoing apparent motion due to pan, tilt and zoom motion of the camera.

To make automatic object-oriented video processing feasible, it is necessary to be able to distinguish the regions in the video sequence that are moving or changing and to separate (i.e., segment) them from the stationary background regions. This segmentation must be performed in the presence of apparent motion, for example, as would be induced by a panning, tilting, rolling, and/or zooming observer (or due to other motion-related phenomena, including actual observer motion). To account for this motion, images are first aligned; that is, corresponding locations in the images (i.e., frames) are determined, as discussed above. After this alignment, objects that are truly moving or changing, relative to the stationary background, can be segmented from the stationary objects in the scene. The stationary regions are then used to create (or to update) the scene model, and the moving foreground objects are identified for each frame.

It is not an easy thing to identify and automatically distinguish between video objects that are moving foreground and stationary background, particularly in the presence of observer motion, as discussed above. Furthermore, to provide the maximum degree of compression or the maximum fineness or accuracy of other video processing techniques, it is desirable to segment foreground objects as finely as possible; this enables, for example, the maintenance of smoothness between successive video frames and crispness within individual frames. Known techniques have proven, however, to be difficult to utilize and inaccurate for small foreground objects and have required excessive processing power and memory. It would, therefore, be desirable to have a technique that permits accurate segmentation between the foreground and background information and accurate, crisp representations of the foreground objects, without the limitations of prior techniques.

SUMMARY OF THE INVENTION

The present invention is directed to a method for segmentation of video into foreground information and background information, based on statistical properties of the source video. More particularly, the method is based on creating and updating statistical information pertaining to a characteristic of regions of the video and the labeling of those regions (i.e., as foreground or background) based on the statistical information. For example, in one embodiment, the regions are pixels, and the characteristic is chromatic intensity. Many other possibilities exist, as will become apparent. In more particular embodiments, the invention is directed to methods of using the inventive video segmentation methods to implement intelligent video surveillance systems.

In embodiments of the invention, a background model is developed containing at least two components. A first component is the scene model, which may be built and updated, for example, as discussed in the aforementioned U.S. patent applications. A second component is a background statistical model.

In a first embodiment, the inventive method comprises a two-pass process of video segmentation. The two passes of the embodiment comprise a first pass in which a background statistical model is built and updated and a second pass in which regions in the frames are segmented. An embodiment of the first pass comprises steps of aligning each video frame with a scene model and updating the background statistical model based on the aligned frame data. An embodiment of the second pass comprises, for each frame, steps of labeling regions of the frame and performing spatial filtering.

In a second embodiment, the inventive method comprises a one-pass process of video segmentation. The single pass comprises, for each frame in a frame sequence of a video stream, steps of aligning the frame with a scene model; building a background statistical model; labeling the regions of the frame; and performing spatial/temporal filtering.

In yet another embodiment, the inventive method comprises a modified version of the aforementioned one-pass process of video segmentation. This embodiment is similar to the previous embodiment, except that the step of building a background statistical model is replaced with a step of building a background statistical model and a secondary statistical model.

Each of these embodiments may be embodied in the forms of a computer system running software executing their steps and a computer-readable medium containing software representing their steps.

DEFINITIONS

In describing the invention, the following definitions are applicable throughout (including above).

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

"Video" refers to motion pictures represented in analog and/or digital form. Examples of video include video feeds from CCTV systems in security, surveillance and anti-terrorism applications, television, movies, image sequences from a camera or other observer, and computer-generated image sequences. These can be obtained from, for example, a wired or wireless live feed, a storage device, a firewire interface, a video digitizer, a video streaming server, device or software component, a computer graphics engine, or a network connection.

"Video processing" refers to any manipulation of video, including, for example, compression and editing.

A "frame" refers to a particular image or other discrete unit within a video.

BRIEF DESCRIPTION OF THE DRAWINGS

Figure 8B:
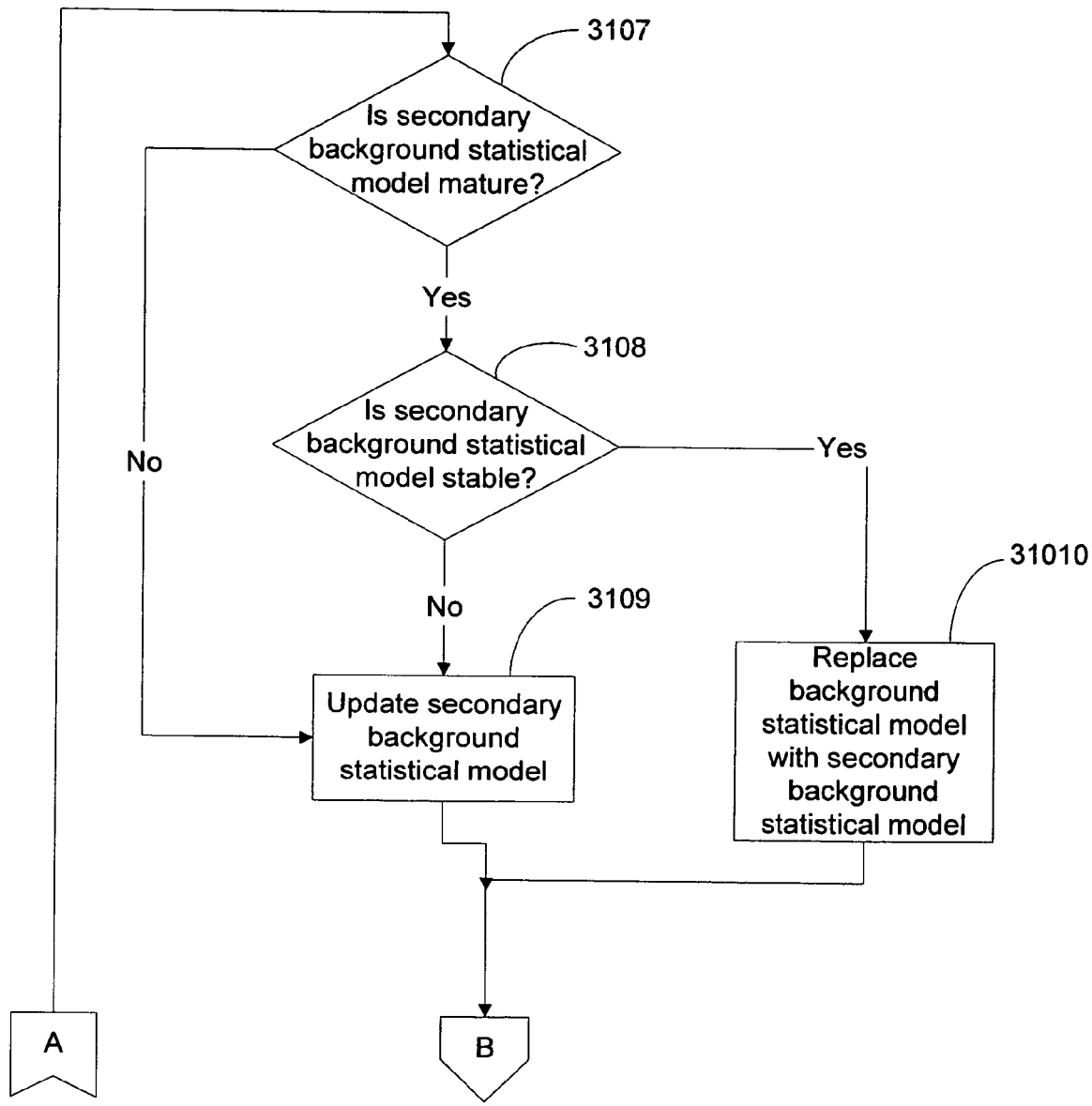

The invention will now be described in further detail in connection with the attached drawings, in which:

FIG. 1 shows a flowchart corresponding to an implementation of a first embodiment of the invention;

FIGS. 2a and 2b show flowcharts corresponding to two alternative embodiments of the labeling step in the flowchart of FIG. 1;

FIGS. 3a and 3b show flowcharts corresponding to implementations of the spatial/temporal filtering step in the flowchart of FIG. 1;

FIG. 4 shows a flowchart corresponding to an implementation of a second embodiment of the invention;

FIG. 5 shows a flowchart corresponding to an implementation of one of the steps in the flowchart of FIG. 4;

FIGS. 6a and 6b together show a flowchart corresponding to an implementation of another one of the steps in the flowchart of FIG. 4;

FIG. 7 shows a flowchart corresponding to an implementation of a third embodiment of the invention;

FIGS. 8a and 8b together show a flowchart corresponding to an implementation of one of the steps in the flowchart of FIG. 7;

FIG. 9 depicts an embodiment of the invention in the form of software embodied on a computer-readable medium, which may be part of a computer system; and FIG. 10 depicts a flowchart of a method of implementing an intelligent video surveillance system according to an embodiment of the invention.

Note that identical objects are labeled with the same reference numerals in all of the drawings that contain them.

DETAILED DESCRIPTION OF THE INVENTION

As discussed above, the present invention is directed to the segmentation of video streams into foreground information, which corresponds to moving objects, and background information, which corresponds to the stationary portions of the video. The present invention may be embodied in a number of ways, of which three specific ones are discussed below. These embodiments are meant to be exemplary, rather than exclusive.

The ensuing discussion refers to "pixels" and "chromatic intensity;" however, the inventive method is not so limited. Rather, the processing may involve any type of region (including regions comprising multiple pixels), not just a pixel, and may use any type of characteristic measured with respect to or related to such a region, not just chromatic intensity.

1. First Embodiment—Two-Pass Segmentation

The first embodiment of the invention is depicted in FIG. 1 and corresponds to a two-pass method of segmentation. As shown in FIG. 1, the method begins by obtaining a frame (or video) sequence from a video stream (Step 1). The frame sequence preferably includes two or more frames of the video stream. The frame sequence can be, for example, a portion of the video stream or the entire video stream. As a portion of the video stream, the frame sequence can be, for example, one continuous sequence of frames of the video stream or two or more discontinuous sequences of frames of the video stream. As part of the alignment step, the scene model is also built and updated.

After Step 1, in Step 2, it is determined whether or not all frames have yet been processed. If not, the next frame is taken and aligned with the underlying scene model of the video stream (Step 3); such alignment is discussed above, and more detailed discussions of alignment techniques may be found, for example, in commonly-assigned U.S. patent application Ser. No. 09/472,162, filed Dec. 27, 1999, and Ser. No. 09/609,919, filed Jul. 3, 2000, both incorporated by reference in their entireties herein, as discussed above, as well as in numerous other references.

The inventive method is based on the use of statistical modeling to determine whether a particular pixel should be classified as being a foreground object or a part thereof or as being the background or a part thereof. Step 4 deals with the building and updating of a statistical model of the background, using each frame aligned in Step 3.

The statistical model of the present invention comprises first- and second-order statistics. In the ensuing discussion, mean and standard deviation will be used as such first- and second-order statistics; however, this is meant to be merely exemplary of the statistics that may be used.

In general, the mean of N samples, $\bar{x}$, is computed by taking the sum of the samples and dividing it by N, i.e., $$\bar{x} = \frac{\sum_{i=1}^{N} x_i}{N},$$  (1)

where $x_i$ is a particular sample corresponding to a given pixel (or region), which in the present case could be, for example, the measured chromatic intensity of the $i^{th}$ sample corresponding to the given pixel (or region). In the present setting, then, such a mean would be computed for each pixel or region.

While Eqn. (1) gives the general formula for a sample mean, it may not always be optimal to use this formula. In video processing applications, a pixel's sample value may change drastically when an object moves through the pixel and change (drastically) back to a value around its previous value after the moving object is no longer within that pixel. In order to address this type of consideration, the invention utilizes a weighted average, in which the prior values are weighted more heavily than the present value. In particular, the following equation may be used:

$$\bar{x}_N = W_p \bar{x}_{N-1} + W_n x_N.$$  (2)

where $W_p$ is the weight of the past values and $W_n$ is the weight assigned to the newest value. Additionally, $\bar{x}_J$ represents the weighted average taken over J samples, and $x_K$ represents the $K^{th}$ sample. $W_p$ and $W_n$ may be set to any pair of values between zero and one such that their sum is one and such that $W_n < W_p$, so as to guarantee that the past values are more heavily weighted than the newest value. As an example, the inventors have successfully used $W_p = 0.9$ and $W_n = 0.1$.

Standard deviation, $\sigma$, is determined as the square root of the variance, $\sigma^2$, of the values under consideration. In general, variance is determined by the following formula:

$$\sigma^2 = \overline{x^2} - (\bar{x})^2,$$  (3)

where $\overline{x^2}$ represents the average of $x^2$; thus, the standard deviation is given by $$\sigma = \sqrt{\overline{x^2} - (\bar{x})^2}.$$  (4)

Because the inventive method uses running statistics, this becomes $$\sigma_N = \sqrt{\{\overline{x^2}\}_N - (\bar{x}_N)^2},$$  (4a)

where $\bar{x}_N$ is as defined in Eqn. (2) above, and $\{\overline{x^2}\}_N$ is defined as the weighted ave of the squared values of the samples, through the $N^{th}$ sample, and is given by $$\{\overline{x^2}\}_N = W_p \{\overline{x^2}\}_{N-1} + W_n x_N^2.$$  (5)

As in the case of the weighted average of the sample values, the weights are used to assure that past values are more heavily weighted than the present value.

Given this, Step 4 works to create and update the statistical model by computing the value of Eqn. (4a) for each pixel, for each frame. In Step 4, the values for the pixels are also stored on a pixel-by-pixel basis (as opposed to how they are received, i.e., on a frame-by-frame basis); that is, an array of values is compiled for each pixel over the sequence of frames. Note that in an alternative embodiment, Step 4 only performs this storage of values.

Following Step 4, the method returns to Step 2 to check whether or not all of the frames have been processed. If they have, then the method proceeds to Step 5, which commences the second pass of the embodiment.

In Step 5, the statistical background model is finalized. This is done by using the stored values for each pixel and determining their mode, the mode being the value that occurs most often. This may be accomplished, for example, by taking a histogram of the stored values and selecting the value for which the histogram has the highest value. The mode of each pixel is then assigned as the value of the background statistical model for that pixel.

Following Step 5, the method proceeds to Step 6, which determines whether or not all of the frames have been processed yet. If not, then the method proceeds to Step 7, in which each pixel in the frame is labeled as being a foreground (FG) pixel or a background (BG) pixel. Two alternative embodiments of the workings of this step are shown in the flowcharts of FIGS. 2a and 2b.

FIG. 2a depicts a two decision level method. In FIG. 2a, the pixel labeling Step 7 begins with Step 71, where it is determined whether or not all of the pixels in the frame have been processed. If not, then the method proceeds to Step 72 to examine the next pixel. Step 72 determines whether or not the pixel matches the background statistical model, i.e., whether the value of the pixel matches the mode for that pixel. This is performed by taking the absolute difference between the pixel value and the value of the background statistical model for the pixel (i.e., the mode) and comparing it with a threshold; that is, $$\Delta = |x_{pixel} - m_{pixel}| \qquad (6)$$

is compared with a threshold θ. In Eqn. (6), $x_{pixel}$ denotes the value of the pixel, while $m_{pixel}$ represents the value of the statistical background model for that pixel.

The threshold θ may be determined in many ways. For example, it may be taken to be a function of standard deviation (of the given pixel), σ. In a particular exemplary embodiment, θ=3σ; in another embodiment, θ=Kσ, where K is chosen by the user. As another example, θ may be assigned a predetermined value (again, for each pixel) or one chosen by the user.

If Δ≦θ, then the pixel value is considered to match the background statistical model. In this case, the pixel is labeled as background (BG) in Step 73, and the algorithm proceeds back to Step 71. Otherwise, if Δ>θ, then the pixel value is considered not to match the background statistical model, and the pixel is labeled as foreground (FG) in Step 74. Again, the algorithm then proceeds back to Step 71. If Step 71 determines that all of the pixels (in the frame) have been processed, then Step 7 is finished.

FIG. 2b depicts a three decision level method, labeled 7'. In FIG. 2b, the process once again begins with Step 71, a step of determining whether or not all pixels have yet been processed. If not, the process considers the next pixel to be processed and executes Step 72, the step of determining whether or not the pixel being processed matches the background statistical model; this is done in the same way as in FIG. 2a. If yes, then the pixel is labeled as BG (Step 73), and the process loops back to Step 71. If not, then the process proceeds to Step 75; this is where the process of FIG. 2b is distinguished from that of FIG. 2a.

In Step 75, the process determines whether or not the pixel under consideration is far from matching the background statistical model. This is accomplished via a threshold test similar to Step 72, only in Step 75, θ is given a larger value. As in Step 72, θ may be user-assigned or predetermined. In one embodiment, θ=Nσ, where N is either a predetermined or user-set number, N>K. In another embodiment, N=6.

If the result of Step 75 is that Δ≦θ, then the pixel is labeled as FG (Step 74). If not, then the pixel is labeled definite foreground (DFG), in Step 76. In each case, the process loops back to Step 71. Once Step 71 determines that all pixels in the frame have been processed, Step 7' is complete.

Returning to FIG. 1, once all of the pixels of a frame have been labeled, the process proceeds to Step 8, in which spatial/temporal filtering is performed. While shown as a sequential step in FIG. 1, Step 8 may alternatively be performed in parallel with Step 7. Details of Step 8 are shown in the flowcharts of FIGS. 3a and 3b.

In FIG. 3a, Step 8 commences with a test as to whether or not all the pixels of the frame have been processed (Step 81). If not, in Step 85, the algorithm selects the next pixel, $P_i$, for processing and proceeds to Step 82, where it is determined whether or not the pixel is labeled as BG. If it is, then the process goes back to Step 81. If not, then the pixel undergoes further processing in Steps 83 and 84.

Step 83, neighborhood filtering, is used to correct for misalignments when the images are aligned. If the current image is slightly misaligned with the growing background statistical model, then, particularly near strong edges, the inventive segmentation procedure, using the background statistical model, will label pixels as foreground. Neighborhood filtering will correct for this. An embodiment of Step 83 is depicted in the flowchart of FIG. 3b.

In FIG. 3b, Step 83 begins with Step 831, where a determination is made of the scene model location, $P_m$, corresponding to $P_i$. Next, a neighborhood, comprising the pixels, $P'_m$, surrounding $P_m$ in the scene model, is selected (Step 832). Step 833 next determines if all of the pixels in the neighborhood have been processed. If yes, Step 83 is complete, and the label of $P_i$ remains as it was; if not, the process proceeds to Step 834, where the next neighborhood pixel $P'_m$ is considered. Step 835 then tests to determine whether or not $P_i$ matches $P'_m$. This matching test is accomplished by executing the labeling step (Step 7 or 7') in a modified fashion, using $P_i$ as the pixel under consideration and $P'_m$ as the "corresponding" background statistical model point. If the labeling step returns a label of FG or DFG, there is no match, whereas if it returns a label of BG, there is a match. If there is no match, the process loops back to Step 833; if there is a match, then this is an indication that $P_i$ might be mislabeled, and the process continues to Step 836. In Step 836, a neighborhood, comprising the pixels, $P'_i$, surrounding $P_i$ in the frame, is selected, and an analogous process is performed. That is, in Step 833, it is determined whether or not all of the pixels, $P'_i$, in the neighborhood have yet been considered. If yes, then Step 83 is complete, and the label of $P_i$ remains as it was; if not, then the process proceeds to Step 838, where the next neighborhood pixel, $P'_i$, is considered. Step 839 tests to determine if $P_m$ matches $P'_i$; this is performed analogously to Step 833, with the $P'_i$ under consideration being used as the pixel being considered and $P_m$ as its "corresponding" background statistical model point. If it does not, then the process loops back to Step 837; if it does, then $P_i$ is relabeled as BG, and Step 83 is complete.

Returning to FIG. 3a, following Step 83, Step 84 is executed, in which morphological erosions and dilations are performed. First, a predetermined number, n, of erosions are performed to remove incorrectly labeled foreground. Note that pixels labeled DFG may not be eroded because they represent either a pixel that is almost certainly foreground. This is followed by n dilations, which restore the pixels that were correctly labeled as foreground but were eroded. Finally, a second predetermined number, m, of dilations are performed to fill in holes in foreground objects. The erosions and dilations may be performed using conventional erosion and dilation techniques, applied in accordance with user-specified parameters, and modified, as discussed above, such that pixels labeled DFG are not eroded.

In alternative embodiments, Step 84 may comprise filtering techniques other than or in addition to morphological erosions and dilations. In general, Step 84 may employ any form or forms of spatial and/or temporal filtering.

Returning to FIG. 1, following Step 8, the algorithm returns to Step 6, to determine whether or not all frames have been processed. If yes, then the processing of the frame sequence is complete, and the process ends (Step 9).

This two-pass embodiment has the advantage of relative simplicity, and it is an acceptable approach for applications not requiring immediate or low-latency processing. Examples of such applications include off-line video compression and non-linear video editing and forensic processing of security and surveillance video. On the other hand, many other applications such as video security and surveillance in which timely event reporting is critical do have such requirements, and the embodiments to be discussed below are tailored to address these requirements.

2. Second Embodiment—One-Pass Segmentation

FIG. 4 depicts a flowchart of a one-pass segmentation process, according to a second embodiment of the invention. Comparing FIG. 4 with FIG. 1 (the first embodiment), the second embodiment differs in that there is only a single pass of processing for each frame sequence. This single pass, as shown in Steps 2, 3, 31, 32, 8 in FIG. 4, incorporates the processes of the second pass (Steps 5–8 in FIG. 1) with the first pass (Steps 2–4 in FIG. 1), albeit in a modified form, as will be discussed below.

As in the case of the first embodiment, the second embodiment (one-pass process), shown in FIG. 4, begins by obtaining a frame sequence (Step 1). As in the first embodiment, the process then performs a test to determine whether or not all of the frames have yet been processed (Step 2). Also as in the first embodiment, if the answer is no, then the next frame to be processed is aligned with the scene model (Step 3). As discussed above, the scene model component of the background model is built and updated as part of Step 3, so there is always at least a deterministically-determined value in the background model at each location.

At this point, the process includes a step of building a background statistical model (Step 31). This differs from Step 4 of FIG. 1, and is depicted in further detail in FIG. 5. The process begins with a step of determining whether or not all pixels in the frame being processed have been processed (Step 311). If not, then the process determines whether or not the background statistical model is "mature" (Step 312) and "stable" (Step 313).

The reason for Steps 312 and 313 is that, initially, the statistical background model will not be sufficiently developed to make accurate decisions as to the nature of pixels. To overcome this, some number of frames should be processed before pixels are labeled (i.e., the background statistical model should be "mature"); in one embodiment of the present invention, this is a user-defined parameter. This may be implemented as a "look-ahead" procedure, in which a limited number of frames are used to accumulate the background statistical model prior to pixel labeling (Step 32 in FIG. 4).

While simply processing a user-defined number of frames may suffice to provide a mature statistical model, stability is a second concern (Step 313), and it depends upon the standard deviation of the background statistical model. In particular, as will be discussed below, the statistical background model includes a standard deviation for each pixel. The statistical model (for a particular pixel) is defined as having become "stable" when its variance (or, equivalently, its standard deviation) is reasonably small. In an embodiment of the present invention, Step 313 determines this by comparing the standard deviation with a user-defined threshold parameter; if the standard deviation is less than this threshold, then the statistical background model (for that pixel) is determined to be stable.

As to the flow of Step 31, in FIG. 5, if the background statistical model is determined to be mature (Step 312), it is determined whether or not the background statistical model is stable (Step 313). If either of these tests (Steps 312 and 313) fails, the process proceeds to Step 315, in which the background statistical model of the pixel being processed is updated using the current value of that pixel. Step 315 will be explained further below.

If the background statistical model is determined to be both mature and stable (in Steps 312 and 313), the process proceeds to Step 314, where it is determined whether or not the pixel being processed matches the background statistical model. If yes, then the background statistical model is updated using the current pixel value (Step 315); if no, then the process loops back to Step 311 to determine if all pixels in the frame have been processed.

Step 314 operates by determining whether or not the current pixel value is within some range of the mean value of the pixel, according to the current background statistical model. In one embodiment of the invention, the range is a user-defined range. In yet another embodiment, it is determined to be a user-defined number of standard deviations; i.e., the pixel value, x, matches the background statistical model if $$|x_{pixel} - \overline{x_{pixel}}| \le K\sigma, \qquad (7)$$

where K is the user-defined number of standard deviations, $\sigma$; $x_{pixel}$ is the current pixel value; and $\overline{x_{pixel}}$ is the mean value of the current pixel in the background statistical model. The purpose of performing Step 314 is to ensure, to the extent possible, that only background pixels are used to develop and update the background statistical model.

In Step 315, the background statistical model is updated. In this embodiment, the background statistical model consists of the mean and standard deviation of the values for each pixel (over the sequence of frames). These are computed according to Eqns. (2) and (4a) above.

Following Step 315, the process loops back to Step 311, to determine if all pixels (in the current frame) have been processed. Once all of the pixels have been processed, the process proceeds to Step 316, where the background statistical model is finalized. This finalization consists of assigning to each pixel its current mean value and standard deviation (i.e., the result of processing all of the frames up to that point).

Note that it is possible for the background statistical model for a given pixel never to stabilize. This generally indicates that the particular pixel is not a background pixel in the sequence of frames, and there is, therefore, no need to assign it a value for the purposes of the background statistical model. Noting that, as discussed above, a scene model is also built and updated, there is always at least a deterministically-determined value associated with each pixel in the background model.

Following Step 316, the process goes to Step 32, as shown in FIG. 4, where the pixels in the frame are labeled according to their type (i.e., definite foreground, foreground or background). Step 32 is shown in further detail in the flowchart of FIGS. 6a and 6b.

The following concepts are embodied in the description of Step 32 to follow. Ideally, labeling would always be done by testing each pixel against its corresponding point in the background statistical model, but this is not always possible. If the background statistical model is not ready to use on the basis of number of frames processed (i.e., "mature"), then the process must fall back on testing against the corresponding point in the scene model. If the background statistical model is ready to use but has not yet settled down (i.e., is not "stable"), this is a sign that the pixel is varying and should be labeled as being foreground. If the background statistical model has, for some reason (i.e., because it fails to match the scene model or because it has become unsettled again), become unusable, the process must once again fall back on testing against the scene model.

As shown in FIG. 6a, Step 32 begins with Step 321, where it is determined whether or not all pixels (in the current frame) have been processed. If yes, Step 32 is complete; if not, the next pixel is processed in Steps 322 et seq.

Step 322 determines whether or not the background statistical model is mature. This is done in the same manner as in Step 312 of FIG. 5, discussed above. If not, the process proceeds to Step 323, where it is determined whether or not the pixel matches the background chromatic data of the corresponding point of the scene model.

Step 323 is performed by carrying out a test to determine whether or not the given pixel falls within some range of the background chromatic data value. This is analogous to Step 314 of FIG. 5, substituting the background chromatic data value for the statistical mean. The threshold may be determined in a similar fashion (predetermined, user-determined, or the like).

If Step 323 determines that the pixel does match the background chromatic data, then the pixel is labeled BG (following connector A) in Step 329 of FIG. 6b. From Step 329, the process loops back (via connector D) to Step 321.

If Step 323 determines that the pixel does not match the background chromatic data, then the pixel is labeled FG (following connector B) in Step 3210 of FIG. 6b. From the Step 3210, the process loops back (via connector D) to Step 321.

If Step 322 determines that the background statistical model is mature, processing proceeds to Step 324, which determines whether or not the background statistical model is stable. Step 324 performs this task in the same manner as Step 313 of FIG. 5, discussed above. If not, the process proceeds to Step 325, where it is determined if the background statistical model was ever stable (i.e., if it was once stable but is now unstable). If yes, then the process branches to Step 323, and the process proceeds from there as described above. If no, the pixel is labeled DFG (following connector C) in Step 3211 of FIG. 6b, after which the process loops back (via connector D) to Step 321.

If Step 324 determines that the background statistical model is stable, the process goes to Step 326. Step 326 tests whether the background statistical model matches the background chromatic data. Similar to the previous matching tests above, this test takes an absolute difference between the value of the background statistical model (i.e., the mean) for the pixel and the background chromatic data (i.e., of the scene model) for the pixel. This absolute difference is then compared to some threshold value, as above (predetermined, user-determined, or the like).

If Step 326 determines that there is not a match between the background statistical model and the background chromatic data, the process branches to Step 323, where processing proceeds in the same fashion as described above. If Step 326, on the other hand, determines that there is a match, the process continues to Step 327.

Step 327 determines whether or not the current pixel matches the background statistical model. This step is performed in the same manner as Step 314 of FIG. 5, discussed above. If the current pixel does match (which, as discussed above, is determined by comparing it to the mean value corresponding to the current pixel), the pixel is labeled BG (following connector A) in Step 329 of FIG. 6b, and the process then loops back (via connector D) to Step 321. If not, then further testing is performed in Step 328.

Step 328 determines whether, given that the current pixel value does not reflect a BG pixel, it reflects a FG pixel or a DFG pixel. This is done by determining if the pixel value is far from matching the background statistical model. As discussed above, a FG pixel is distinguished from a BG pixel (in Step 325) by determining if its value differs from the mean by more than a particular amount, for example, a number of standard deviations (see Eqn. (7)). Step 328 applies the same test, but using a larger range. Again, the threshold may set as a predetermined parameter, as a computed parameter, or as a user-defined parameter, and it may be given in terms of a number of standard deviations from the mean, i.e., $$|x_{pixel} - \overline{x_{pixel}}| \leq N\sigma, \qquad (8)$$

where N is a number greater than K of Eqn. (7). If the pixel value lies outside the range defined, for example, by Eqn. (8), it is labeled DFG (following connector C) in Step 3211 of FIG. 6b, and the process loops back (via connector D) to Step 321. If it lies within the range, the pixel is labeled FG (following connector B) in Step 3210 of FIG. 6b, and the process proceeds (via connector D) to Step 321.

After Step 32 is complete, the process proceeds to Step 8, as shown in FIG. 4, where spatial/temporal filtering is performed on the pixels in the frame. Step 8 is implemented, in this embodiment of the invention, in the same manner in which it is implemented for the two-pass embodiment, except that the pixel labeling algorithm of FIGS. 6a and 6b is used for Steps 833 and 837 of Step 83 (as opposed to the pixel labeling algorithms used in the two-pass embodiment). Following Step 8, the process loops back to Step 2, where, if all frames have been processed, the process ends.

A single-pass approach, like the one present here, has the advantage of not requiring a second pass, thus, reducing the latency associated with the process. This is useful for applications in which high latencies would be detrimental, for example, video teleconferencing, webcasting, real-time gaming, and the like.

3. Third Embodiment—Modified One-Pass Segmentation

While the one-pass approach described above has a lower latency than the two-pass approach, it does have a disadvantage in regard to the background statistical model. In particular, the cumulative statistical modeling approach used in the one-pass embodiment of the invention may stabilize on a non-representative statistical model for an element (i.e., pixel, region, etc.; that is, whatever size element is under consideration). If the values (e.g., chromatic values) of frame elements corresponding to a particular element of the video scene fundamentally change (i.e., something happens to change the video, for example, a parked car driving away, a moving car parking, the lighting changes, etc.), then the scene model element will no longer accurately represent the true scene. This can be addressed by utilizing a mechanism for dynamically updating the background statistical model so that at any given time it accurately represents the true nature of the scene depicted in the video. Such a mechanism is depicted in the embodiment of the invention shown in FIG. 7.

In FIG. 7, Steps 1-3, 32, 8, and 9 are as described in the one-pass embodiment above. The embodiment of FIG. 7 differs from that of FIG. 4 in that after a given frame is aligned with the scene model (Step 3), the process executes Step 310, in which the background statistical model and, simultaneously, a secondary background statistical model are built. Step 310 is more fully described in connection with FIGS. 8a and 8b.

As shown in FIG. 8a, Step 310 includes all of the steps shown in Step 31 in FIG. 5 (which are shown using the same reference numerals), and it begins with a step of determining whether or not all pixels have yet been processed (Step 311). If not, the next pixel is processed by proceeding to Step 312. In Step 312, it is determined whether or not the background statistical model is mature. If not, the process branches to Step 315, where the pixel is used to update the background statistical model. Following Step 315, the process loops back to Step 311.

If Step 312 determines that the background statistical model is mature, the process proceeds to Step 313, where it is determined whether or not the background statistical model is stable. If it is not, then, as in the case of a negative determination in Step 312, the process branches to Step 315 (and then loops back to Step 311). Otherwise, the process proceeds to Step 314.

In Step 314, it is determined whether or not the pixel under consideration matches the background statistical model. If it does, the process proceeds with Step 315 (and then loops back to Step 311); otherwise, the process executes the steps shown in FIG. 8b, which build and update a secondary background statistical model. This secondary background statistical model is built in parallel with the background statistical model, as reflected in FIG. 8b; uses the same procedures as are used to build and update the background statistical model; and represents the pixel values that do not match the background statistical model.

Following a negative determination in Step 314, the process then makes a determination as to whether or not the secondary background statistical model is mature (Step 3107). This determination is made in the same fashion as in Step 313. If not, the process branches to Step 3109, where the secondary background statistical model is updated, using the same procedures as for the background statistical model (Step 315). From Step 3109, the process loops back to Step 311 (in FIG. 8a).

If Step 3107 determines that the secondary background statistical model is mature, the process proceeds to Step 3108, which determines (using the same procedures as in Step 314) whether or not the secondary background statistical model is stable. If not, the process proceeds to Step 3109 (and from there to Step 311). If yes, then the process branches to Step 31010, in which the background statistical model is replaced with the secondary background statistical model, after which the process loops back to Step 311. Additionally, concurrently with the replacement of the background statistical model by the secondary background statistical model in Step 31010, the scene model data is replaced with the mean value of the secondary statistical model. At this point, the secondary background statistical model is reset to zero, and a new one will be built using subsequent data.

This modified one-pass embodiment has the advantage of improved statistical accuracy over the one-pass embodiment, and it solves the potential problem of changing background images. It does this while still maintaining improved latency time over the two-pass embodiment, and at only a negligible decrease in processing speed compared with the one-pass embodiment.

4. Additional Embodiments and Remarks

While the above discussion considers two-level and three-level pixel labeling algorithms, this embodiment is not limited only to these cases. Indeed, it is contemplated that an arbitrary number of decision levels, corresponding to different ranges (i.e., threshold values) may be used. In such a case, fuzzy or soft-decision logic would be used to make decisions in subsequent steps of the segmentation process.

The above discussion primarily discusses pixels and chromatic values (which may be RGB, YUV, intensity, etc.); however, as discussed above, the invention is not limited to these quantities. Regions other than pixels may be used, and quantities other than chromatic values may be used.

As discussed above, the invention, including all of the embodiments discussed in the preceding sections, may be embodied in the form of a computer system or in the form of a computer-readable medium containing software implementing the invention. This is depicted in FIG. 9, which shows a plan view for a computer system for the invention. The computer 91 includes a computer-readable medium 92 embodying software for implementing the invention and/or software to operate the computer 91 in accordance with the invention. Computer 91 receives a video stream and outputs segmented video, as shown. Alternatively, the segmented video may be further processed within the computer.

Also as discussed above, the statistical pixel modeling methods described above may be incorporated into a method of implementing an intelligent video surveillance system. FIG. 10 depicts an embodiment of such a method. In particular, block 1001 represents the use of statistical pixel modeling, e.g., as described above. Once the statistical pixel modeling has been completed, block 1002 uses the results to identify and classify objects. Block 1002 may use, for example, statistical or template-oriented methods for performing such identification and classification. In performing identification and classification, it is determined whether or not a given object is an object of interest; for example, one may be interested in tracking the movements of people through an area under surveillance, which would make people "objects of interest." In Block 1003, behaviors of objects of interest are analyzed; for example, it may be determined if a person has entered a restricted area. Finally, in Block 1004, if desired, various notifications may be sent out or other appropriate actions taken.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

We claim:

1. A method of implementing an intelligent video surveillance system, comprising:
obtaining a frame sequence from an input video stream;
executing a first-pass method for each frame of the frame sequence, the first-pass method comprising the steps of:
aligning the frame with a scene model; and
updating a background statistical model;
finalizing the background statistical model;

executing a second-pass method for each frame of the frame sequence, the second-pass method comprising the steps of:
  labeling each region of the frame; and
  performing spatial/temporal filtering of the regions of the frame;
identifying and classifying objects using the labeled and filtered regions; and analyzing behaviors of at least one of the objects.

2. A computer-readable medium comprising software implementing the method of claim 1.

3. An intelligent video surveillance system comprising a computer system comprising:
  a computer; and
  a computer-readable medium according to claim 2.

4. The method of claim 1, wherein said analyzing behaviors of at least one of the objects comprises:
  tracking at least one of the objects.

5. The method of claim 1, further comprising:
  creating at least one rule to detect at least one specific activity;
  wherein said analyzing behaviors of at least one of the objects includes applying the at least one rule.

6. The method of claim 5, wherein said at least one rule includes at least one virtual tripwire and determining when the at least one virtual tripwire is crossed.

7. The method of claim 5, wherein said at least one rule includes a definition of at least one area and the determining at least one of when an object enters, when an object leaves, and when an object loiters in the at least one area.

8. The method of claim 5, wherein said at least one rule includes at least one of determining when an object is added to a scene and determining when an object is removed from a scene.

9. A method of implementing an automated closed-circuit television (CCTV) surveillance system, comprising:
  providing CCTV equipment generating an input video stream; and
  implementing the method of claim 1.

10. A method of implementing an automated security system, comprising the method of claim 1.

11. A method of implementing an automated anti-terrorism system, comprising the method of claim 1.

12. A method of implementing an automated market research system, comprising the method of claim 1.

13. The method of claim 12, wherein said analyzing behaviors of at least one of the objects comprises:
  tracking behaviors of at least one of the objects in at least one retail location.

14. A method of implementing an automated traffic monitoring system, comprising the method of claim 1.

15. The method of claim 14, wherein said analyzing behaviors of at least one of the objects comprises at least one of:
  detecting wrong-way traffic;
  detecting a broken-down vehicle;
  detecting an accident; and
  detecting a road blockage.

16. A method of implementing a video compression system comprising the method of claim 1.

17. A method of implementing an intelligent video surveillance system, comprising:
  obtaining a frame sequence from a video stream;
  for each frame in the frame sequence, performing the following steps:
    aligning the frame with a scene model;
    building a background statistical model;
    labeling the regions of the frame; and
    performing spatial/temporal filtering;
  identifying and classifying objects based on the results of the labeling and filtering; and
  analyzing behaviors of at least one object.

18. A computer-readable medium comprising software implementing the method of claim 17.

19. An intelligent video surveillance system comprising a computer system comprising:
  a computer; and
  a computer-readable medium according to claim 18.

20. The method of claim 17, wherein said analyzing behaviors of at least one of the objects comprises:
  tracking at least one of the objects.

21. The method of claim 17, further comprising:
  creating at least one rule to detect at least one specific activity;
  wherein said analyzing behaviors of at least one of the objects includes applying the at least one rule.

22. The method of claim 21, wherein said at least one rule includes at least one virtual tripwire and determining when the at least one virtual tripwire is crossed.

23. The method of claim 21, wherein said at least one rule includes a definition of at least one area and the determining at least one of when an object enters, when an object leaves, and when an object loiters in the at least one area.

24. The method of claim 21, wherein said at least one rule includes at least one of determining when an object is added to a scene and determining when an object is removed from a scene.

25. A method of implementing an automated closed-circuit television (CCTV) surveillance system, comprising:
  providing CCTV equipment generating an input video stream; and
  implementing the method of claim 17.

26. A method of implementing an automated security system, comprising the method of claim 17.

27. A method of implementing an automated anti-terrorism system, comprising the method of claim 17.

28. A method of implementing an automated market research system, comprising the method of claim 17.

29. The method of claim 28, wherein said analyzing behaviors of at least one of the objects comprises:
  tracking behaviors of at least one of the objects in at least one retail location.

30. A method of implementing an automated traffic monitoring system, comprising the method of claim 17.

31. The method of claim 30, wherein said analyzing behaviors of at least one of the objects comprises at least one of:
  detecting wrong-way traffic;
  detecting a broken-down vehicle;
  detecting an accident; and
  detecting a road blockage.

32. A method of implementing a video compression system, comprising the method of claim 17.

33. A method of implementing a video compression system, comprising the method of claim 17.

34. A method of implementing an intelligent video surveillance system, comprising:
  obtaining a frame sequence from a video stream;
  for each frame in the frame sequence, performing the following steps:
    aligning the frame with a scene model;
    building a background statistical model and a secondary statistical model;

labeling the regions of the frame; and
performing spatial/temporal filtering;
identifying and classifying objects based on the results of the labeling and filtering; and
analyzing behaviors of at least one object.

35. A computer-readable medium comprising software implementing the method of claim 34.

36. An intelligent video surveillance system comprising a computer system comprising:
a computer; and
a computer-readable medium according to claim 35.

37. The method of claim 34, wherein said analyzing behaviors of at least one of the objects comprises:
tracking at least one of the objects.

38. The method of claim 34, further comprising:
creating at least one rule to detect at least one specific activity;
wherein said analyzing behaviors of at least one of the objects includes applying the at least one rule.

39. The method of claim 38, wherein said at least one rule includes at least one virtual tripwire and determining when the at least one virtual tripwire is crossed.

40. The method of claim 38, wherein said at least one rule includes a definition of at least one area and the determining at least one of when an object enters, when an object leaves, and when an object loiters in the at least one area.

41. The method of claim 38, wherein said at least one rule includes at least one of determining when an object is added to a scene and determining when an object is removed from a scene.

42. A method of implementing an automated closed-circuit television (CCTV) surveillance system, comprising:
providing CCTV equipment generating an input video stream; and
implementing the method of claim 34.

43. A method of implementing an automated security system, comprising the method of claim 34.

44. A method of implementing an automated anti-terrorism system, comprising the method of claim 34.

45. A method of implementing an automated market research system, comprising the method of claim 34.

46. The method of claim 45, wherein said analyzing behaviors of at least one of the objects comprises:
tracking behaviors of at least one of the objects in at least one retail location.

47. A method of implementing an automated traffic monitoring system, comprising the method of claim 34.

48. The method of claim 47, wherein said analyzing behaviors of at least one of the objects comprises at least one of:
detecting wrong-way traffic;
detecting a broken-down vehicle;
detecting an accident; and
detecting a road blockage.

49. A method of implementing a video compression system, comprising the method of claim 34.

50. An apparatus for intelligent video surveillance adapted to perform the method comprising:
obtaining a frame sequence from an input video stream;
executing a first-pass method for each frame of the frame sequence, the first-pass method comprising the steps of:
aligning the frame with a scene model; and
updating a background statistical model;
finalizing the background statistical model;
executing a second-pass method for each frame of the frame sequence, the second-pass method comprising the steps of:
labeling each region of the frame; and
performing spatial/temporal filtering of the regions of the frame;
identifying and classifying objects using the labeled and filtered regions; and
analyzing behaviors of at least one of the objects.

51. The apparatus of claim 50 wherein the apparatus comprises application-specific hardware to emulate a computer and/or software adapted to perform said obtaining, said executing a first-path method, said finalizing, said executing a second-path method, said identifying, and said analyzing.

52. An apparatus for intelligent video surveillance adapted to perform the method comprising:
obtaining a frame sequence from a video stream;
for each frame in the frame sequence, performing the following steps:
aligning the frame with a scene model;
building a background statistical model;
labeling the regions of the frame; and
performing spatial/temporal filtering;
identifying and classifying objects based on the results of the labeling and filtering; and
analyzing behaviors of at least one object.

53. The apparatus of claim 52 wherein the apparatus comprises application-specific hardware to emulate a computer and/or software adapted to perform said obtaining, said aligning, said building, said labeling, said filtering, said identifying, and said analyzing.

* * * * *